US010298657B2

(12) United States Patent
Takei et al.

(10) Patent No.: US 10,298,657 B2
(45) Date of Patent: May 21, 2019

(54) INFORMATION PROCESSING APPARATUS, WEB SERVER, AND NON-TRANSITORY COMPUTER READABLE STORAGE MEDIUM

(71) Applicant: MARS FLAG Corporation, Tokyo (JP)

(72) Inventors: Shinya Takei, Tokyo (JP); Toshiaki Nakatsu, Tokyo (JP); Umihito Kusama, Tokyo (JP); Takahide Ohtake, Tokyo (JP); Kaoru Ashihara, Tokyo (JP)

(73) Assignee: MARS FLAG Corporation, Tokyo (JP)

( * ) Notice: Subject to any disclaimer, the term of this patent is extended or adjusted under 35 U.S.C. 154(b) by 199 days.

(21) Appl. No.: 15/193,702

(22) Filed: Jun. 27, 2016

(65) Prior Publication Data

US 2016/0308937 A1  Oct. 20, 2016

Related U.S. Application Data

(63) Continuation of application No. PCT/JP2013/007695, filed on Dec. 27, 2013.

(51) Int. Cl.
*G06F 17/00* (2019.01)
*H04L 29/08* (2006.01)
(Continued)

(52) U.S. Cl.
CPC ............ *H04L 67/02* (2013.01); *G06F 3/0482* (2013.01); *G06F 16/957* (2019.01);
(Continued)

(58) Field of Classification Search
None
See application file for complete search history.

(56) References Cited

U.S. PATENT DOCUMENTS 6,222,541 B1 *  4/2001  Bates .................... G06F 3/0481
                                              715/786
6,763,496 B1 *  7/2004  Hennings .......... G06F 17/30899
                                              707/E17.119
(Continued)

FOREIGN PATENT DOCUMENTS

JP    2008-217822 A    9/2008
JP    2009-518699 A    5/2009
(Continued)

OTHER PUBLICATIONS

Fukuda: "Firefox no Kakucho Kino wa Tottemo Benri!"; Nikkei Linux, Jun. 2009, vol. 9, p. 173 (see International Search Report for PCT/JP2013/007695 submitted herewith for concise explanation of the relevance, pursuant to MPEP §609.04(a)III).

(Continued)

*Primary Examiner* — Howard Cortes
(74) *Attorney, Agent, or Firm* — Merchant & Gould P.C.

(57) ABSTRACT

An information processing apparatus that receives a link source page file including a plurality of links from a Web server, and displays the link source page file, the information processing apparatus comprising, a communication unit configured to communicate with the Web server, a display unit configured to display the link source page file received from the Web server, a detection unit configured to detect an operation from a user of the information processing apparatus with respect to the link source page file displayed by the display unit, and a processing unit configured to execute a script described in the link source page file.

8 Claims, 21 Drawing Sheets

(51) Int. Cl.
*G06F 16/957* (2019.01)
*G06F 16/958* (2019.01)
*G06F 3/0482* (2013.01)
*G06F 17/22* (2006.01)
*H04L 29/06* (2006.01)
*G06F 16/955* (2019.01)

(52) U.S. Cl.
CPC ........ *G06F 16/958* (2019.01); *G06F 16/9558* (2019.01); *G06F 17/2235* (2013.01); *G06F 17/2247* (2013.01); *H04L 67/42* (2013.01)

(56) References Cited

U.S. PATENT DOCUMENTS

| | | | |
|---|---|---|---|
| 7,627,518 B1* | 12/2009 | West | G06F 3/0481 705/37 |
| 7,975,019 B1* | 7/2011 | Green | G06Q 30/0241 705/14.4 |
| 8,589,781 B2 | 11/2013 | Isozu et al. | |
| 2003/0204815 A1* | 10/2003 | Edwards | G06F 17/30899 715/205 |
| 2005/0060647 A1* | 3/2005 | Doan | G06F 17/30554 715/205 |
| 2005/0149576 A1* | 7/2005 | Marmaros | G06F 17/30882 |
| 2005/0216856 A1* | 9/2005 | Matti | G06F 17/30905 715/768 |
| 2008/0022229 A1* | 1/2008 | Bhumkar | G06F 17/30899 715/838 |
| 2008/0235594 A1* | 9/2008 | Bhumkar | G06F 17/30899 715/738 |
| 2010/0011316 A1* | 1/2010 | Sar | G06F 9/451 715/784 |
| 2010/0259562 A1* | 10/2010 | Miyazawa | G06F 3/04883 345/684 |
| 2011/0035433 A1* | 2/2011 | Iwashita | G06F 17/30893 709/203 |
| 2011/0238662 A1* | 9/2011 | Shuster | G06F 17/30554 707/728 |
| 2011/0258562 A1* | 10/2011 | Zhu | G06F 9/4443 715/760 |
| 2011/0295830 A1* | 12/2011 | Swahn | G06F 17/30905 707/706 |
| 2012/0047423 A1* | 2/2012 | Tomkow | G06F 17/241 715/205 |
| 2012/0144331 A1* | 6/2012 | Tolonen | G06F 3/0484 715/769 |
| 2012/0317476 A1* | 12/2012 | Goldman | G06F 17/2235 715/243 |
| 2013/0091451 A1* | 4/2013 | Holecek | G06F 3/0481 715/766 |
| 2013/0091457 A1* | 4/2013 | Ferri | G06F 3/04812 715/781 |
| 2013/0262264 A1* | 10/2013 | Karstoft | G06Q 30/0633 705/26.8 |
| 2013/0263023 A1* | 10/2013 | Goodwin | G06F 3/0484 715/760 |
| 2014/0250409 A1* | 9/2014 | Shah | G06F 17/30905 715/790 |
| 2014/0359462 A1* | 12/2014 | Khalil | H04M 3/5183 715/738 |
| 2015/0067582 A1* | 3/2015 | Donnelly | G06F 3/0485 715/784 |
| 2015/0121302 A1* | 4/2015 | Wang | G06F 3/0482 715/800 |

FOREIGN PATENT DOCUMENTS

| | | |
|---|---|---|
| JP | 2010-205180 A | 9/2010 |
| JP | 2013-012246 A | 1/2013 |

OTHER PUBLICATIONS

International Search Report for PCT/JP2013/007695, dated Apr. 1, 2014.

* cited by examiner

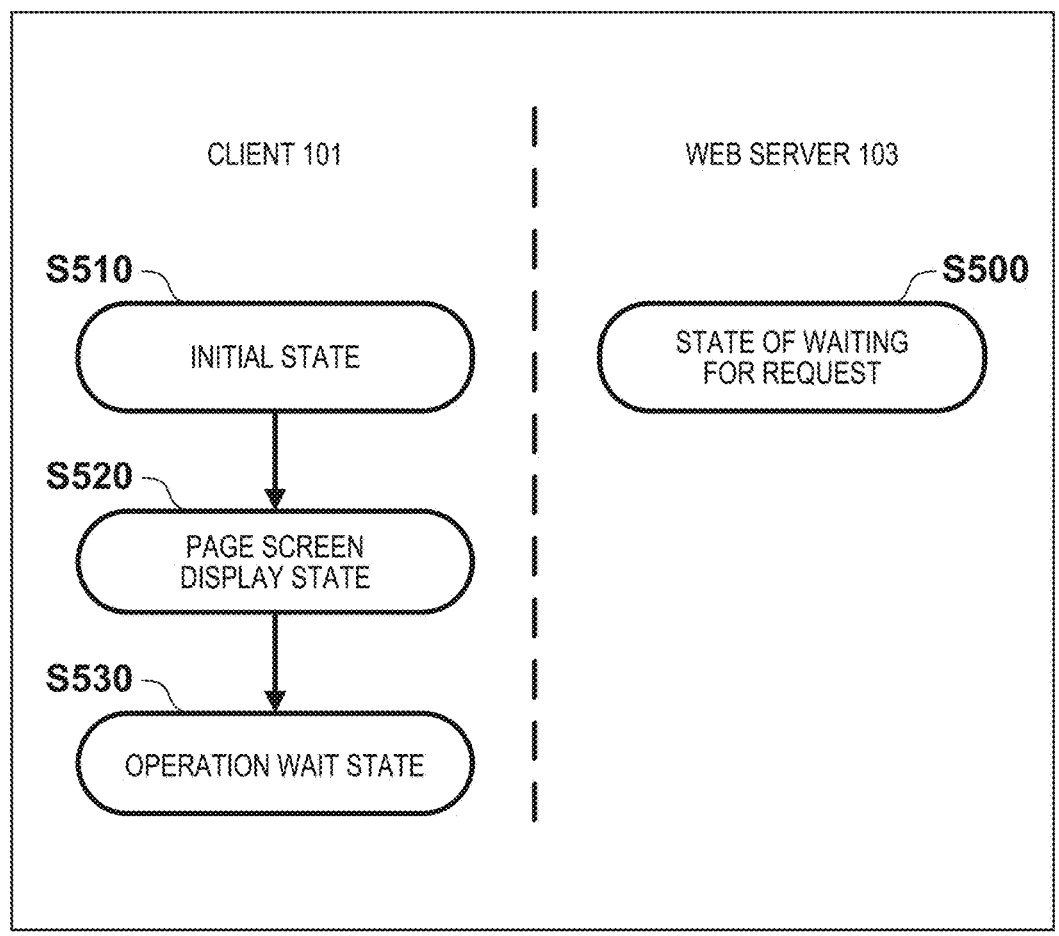

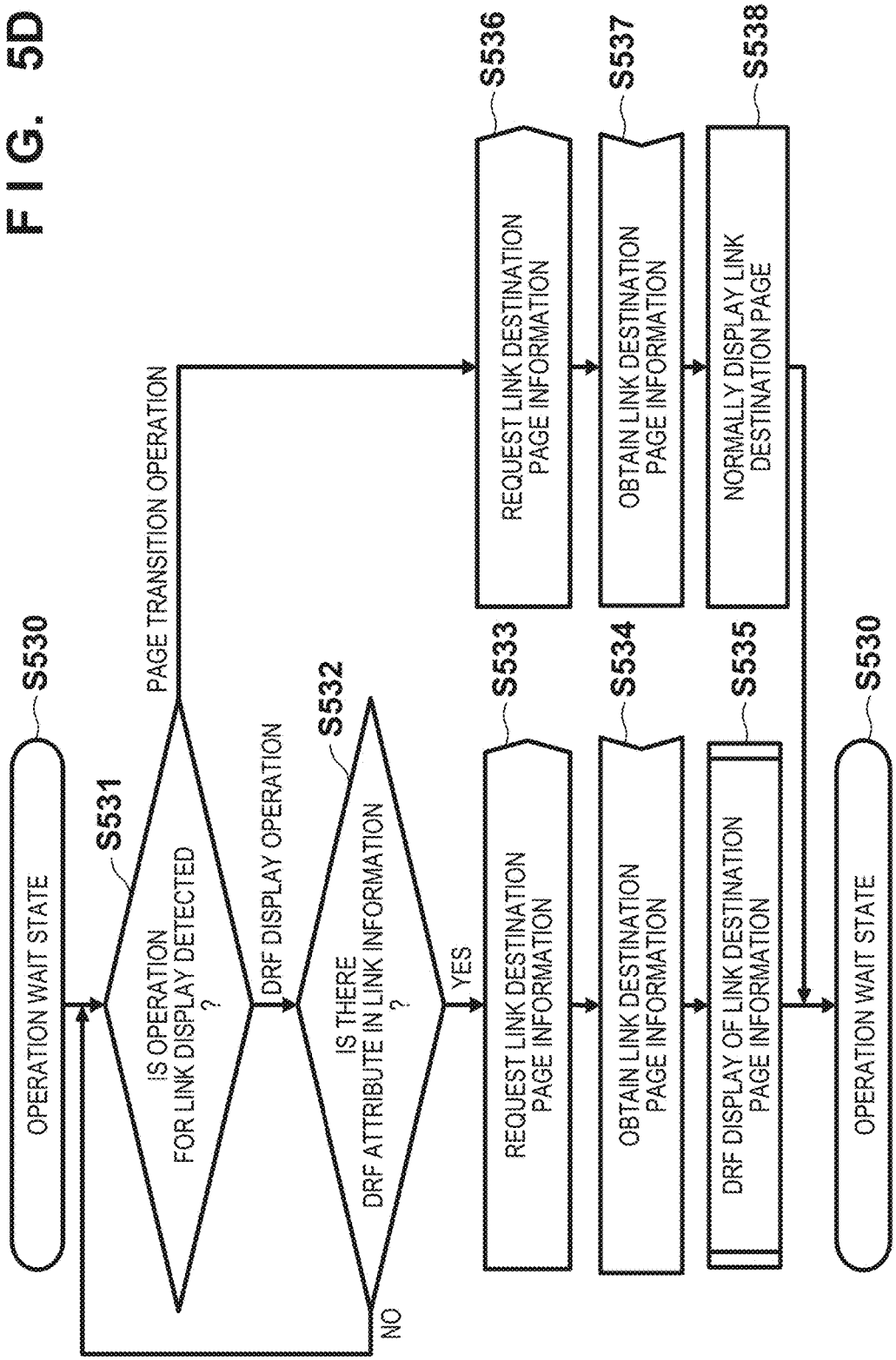

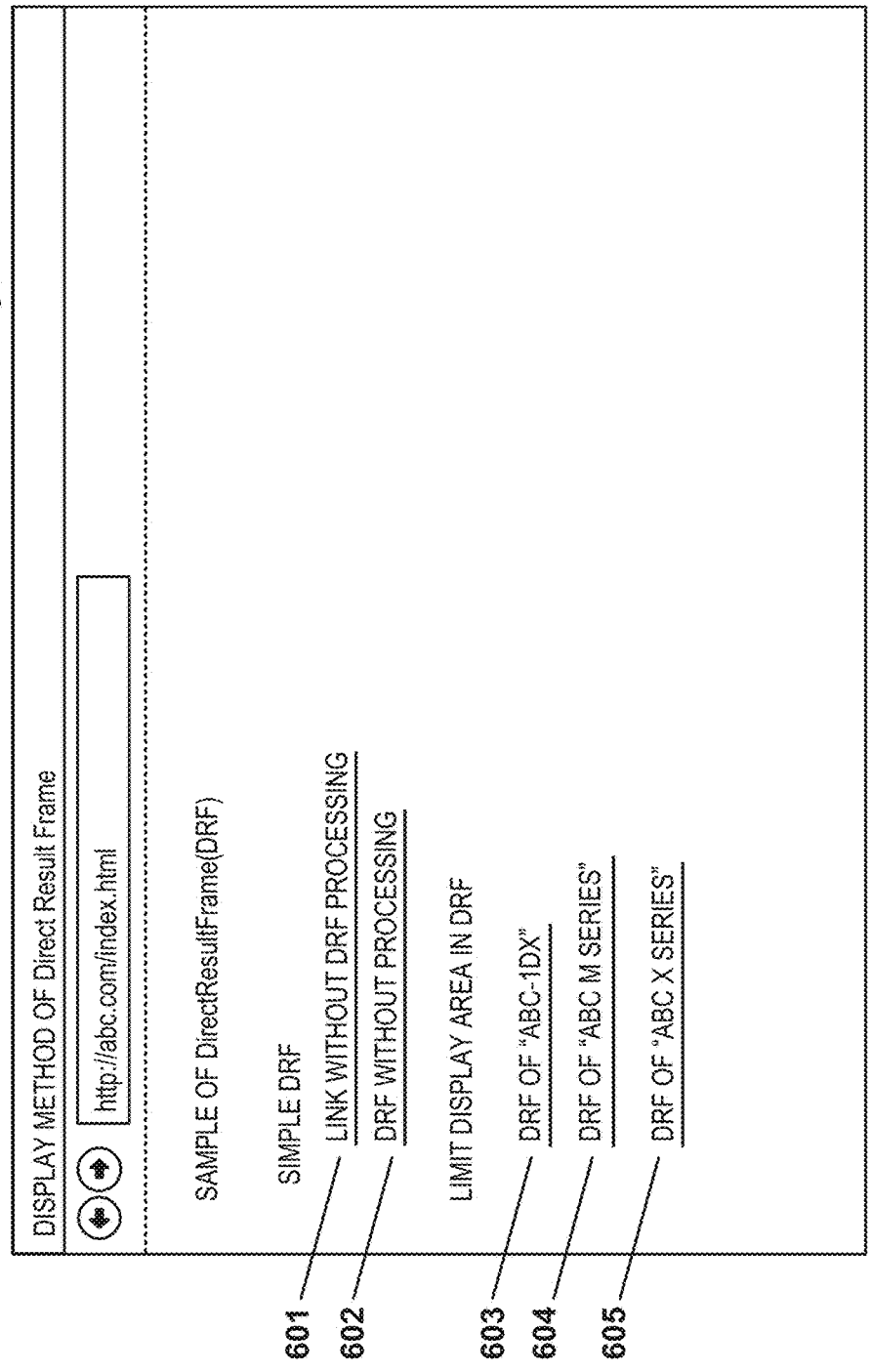

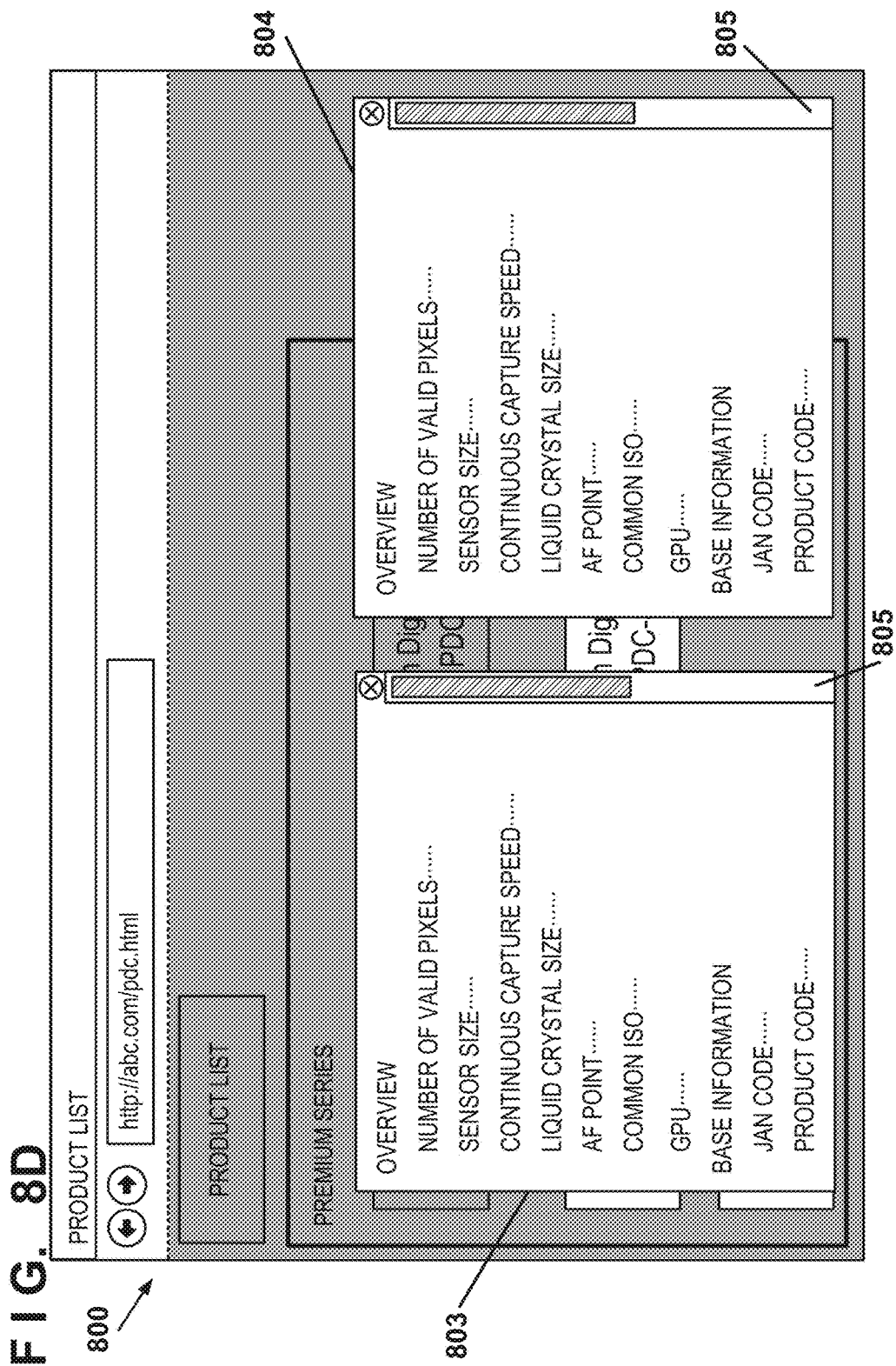

INFORMATION PROCESSING APPARATUS, WEB SERVER, AND NON-TRANSITORY COMPUTER READABLE STORAGE MEDIUM

This application is a continuation of International Patent Application No. PCT/JP2013/007695 filed on Dec. 27, 2013, the entire content of which is incorporated herein by reference.

TECHNICAL FIELD

The invention relates to an information processing apparatus, a Web server, and a non-transitory computer readable storage medium.

BACKGROUND ART

In recent years, the Internet has spread rapidly, and it has become possible to acquire vast amounts of information via the Internet. This information is provided in accordance with an HTTP protocol as file information of an HTML format and is called a Web page, and it can be browsed by an application called a browser. Various pieces of link information are inserted in the Web page, and it is possible to immediately switch display from the Web page to another page that is the link destination by a single click operation. However, it is common to not be able to check details of another page that is a link destination without switching a screen display by clicking.

With respect to this, Japanese Patent Laid-Open No. 2010-205180 proposes an invention that previews in advance information relating to another page (page B) included in a page (page A) which the information processing apparatus has received from a Web server. Specifically, in Japanese Patent Laid-Open No. 2010-205180, an analysis apparatus obtains page B from a Web server in advance, analyzes content thereof, and provides obtained information in accordance with a request from an information processing apparatus. The information processing apparatus uses the information received from the analysis apparatus, and performs a preview display in accordance with an operation by a user.

In the above proposed invention, processing is complicated because there is a necessity for an analysis apparatus to analyze page information of a processing target in advance by a technique such as data mining, and for the analysis apparatus to provide an information processing apparatus with information to be displayed by the information processing apparatus. In addition, regarding information of a single link destination, although it is possible to present the information at a plurality of levels of detail, it is not possible to simultaneously provide page information of a plurality of link destinations in one screen.

SUMMARY OF INVENTION

Processing that preview-displays a link destination page by processing on the side of an information processing apparatus that received a page will be provided, as well as provision of a plurality of pieces of link destination page information in one screen.

One aspect of embodiments relates to an information processing apparatus that receives a link source page file including a plurality of links from a Web server, and displays the link source page file, the information processing apparatus comprising, a communication unit configured to communicate with the Web server, a display unit configured to display the link source page file received from the Web server, a detection unit configured to detect an operation from a user of the information processing apparatus with respect to the link source page file displayed by the display unit, and a processing unit configured to execute a script described in the link source page file, wherein in response that the processing unit executes the script when the detection unit detects a frame display operation with respect to any of the plurality of links included in the link source page file, the communication unit receives from the Web server a page file of the operated link destination, and the display unit performs a frame display of the page file of the link destination in a first frame overlapped on the display of the link source page file, and if the display unit is overlappingly displaying the page file of the link destination in the first frame and if the detection unit has detected a frame display operation with respect to another link that has not been operated out of the plurality of links, the communication unit receives from the Web server a page file of the other link destination that was operated, and the display unit, while maintaining the display of the first frame, performs a frame display of the page file of the other link destination in a second frame that is different from the first frame and is overlapped on the display of the link source page file.

Another aspect of embodiments relates to an information processing apparatus that receives a link source page file including a plurality of links from a Web server, and displays the link source page file, the information processing apparatus comprising, a communication unit configured to communicate with the Web server, a display unit configured to display the link source page file received from the Web server, and a detection unit configured to detect an operation from a user of the information processing apparatus with respect to the link source page file displayed by the display unit, wherein if the detection unit detects a frame display operation with respect to any of the plurality of links included in the link source page file, the communication unit receives from the Web server a page file of the operated link destination, and the display unit performs a frame display in a frame overlapped on the display of the link source page file of information of sub-trees in the page file of the link destination that are narrowed down based on information for narrowing down sub-trees in the page file included in the link information in the link source page file.

Another aspect of embodiments relates to a Web server that receives a request for a page file from an information processing apparatus, and transmits the requested page file, the Web server comprising, a processing unit configured to manage a page file that includes a plurality of links, and a communication unit configured to communicate with the information processing apparatus and transmitting the requested page file, wherein the processing unit adds to link information in a page file a parameter for narrowing down display information within frames when link destination page files of the plurality of links included in the page file are displayed within the frames in the information processing apparatus, and associates with the link destination page files a script for causing the information processing apparatus to perform narrowing down of display content within the frame based on the parameter.

Further features of the present invention will become apparent from the following description of exemplary embodiments (with reference to the attached drawings).

BRIEF DESCRIPTION OF DRAWINGS

The accompanying drawings, which are incorporated in and constitute a part of the specification, illustrate embodiments of the invention and, together with the description, are employed to explain the principles of the invention.

FIG. 5A is a flowchart for illustrating an example of DRF display processing corresponding to embodiments of the invention.

FIG. 5D is a flowchart for illustrating an example of processing in an operation wait state of the client 101 in the DRF display processing corresponding to embodiments of the invention.

FIG. 6A is a view for illustrating an example of a window display of a link source page corresponding to embodiments of the invention.

FIG. 8D is a view for illustrating an example of a DRF display of page information of link destinations having common items that does not narrow down display items corresponding to embodiments of the invention.

DESCRIPTION OF THE EMBODIMENTS

Below, explanation is given of embodiments of the invention with reference to the attached drawings. However, the configuration elements described in this embodiment are only examples, and the scope of the invention is not limited thereto.

<System Configuration>

Figure 1:
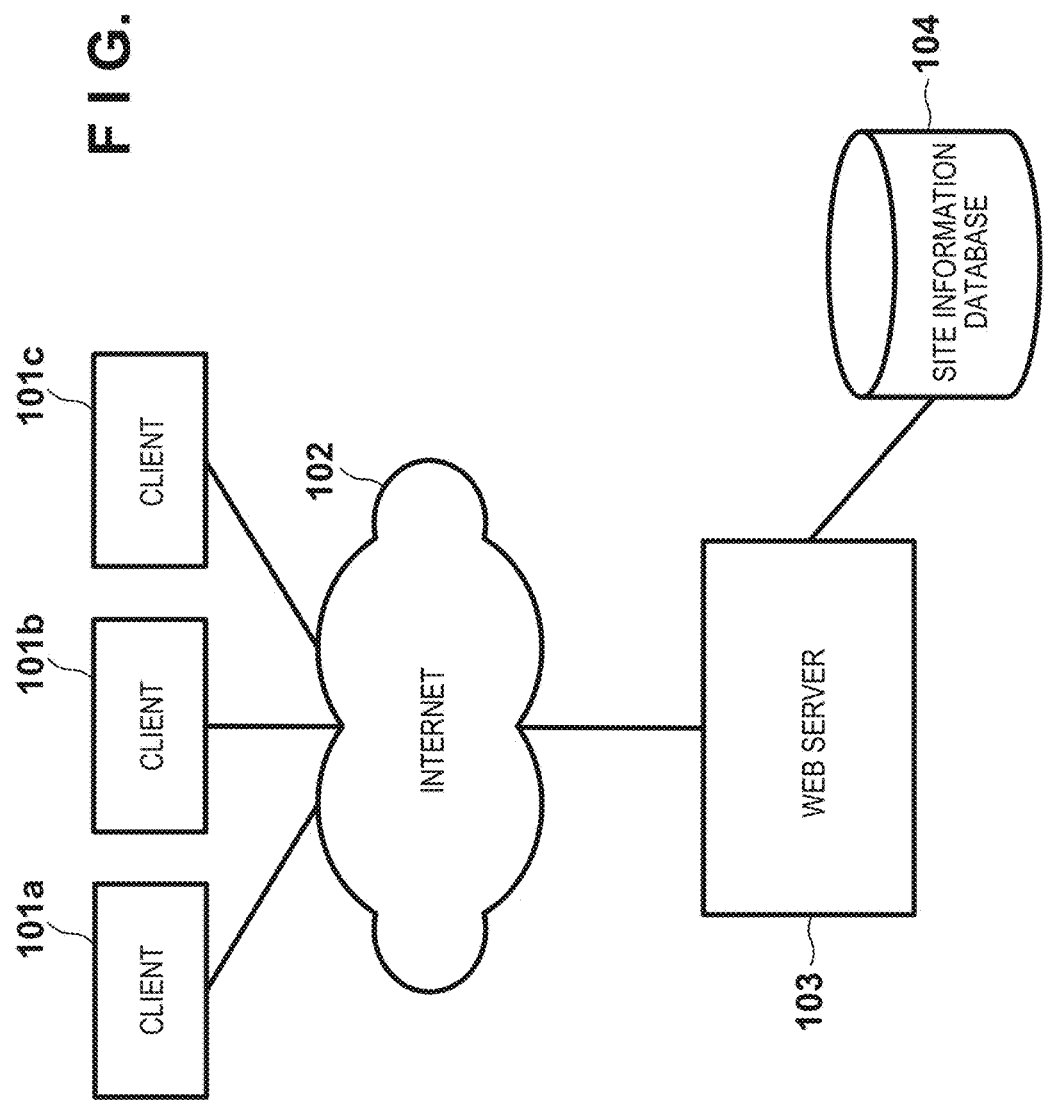
FIG. 1 is a block diagram for illustrating an overall configuration of a DRF display system for a Web site on the Internet, corresponding to embodiments of the invention.

FIG. 1 is a block diagram for illustrating an overall configuration of a system corresponding to the present embodiment. Clients 101a, 101b, and 101c (hereinafter, these are collectively referred to as the "client 101") that are operated by users to obtain document files that can be obtained on the Internet, and a Web server 103 for providing information of a Web site are each connected to the Internet 102. The Web server 103 is connected to a site information database 104.

The client 101 is an information processing apparatus that a user can operate to browse Web site information published on the Internet by the Web server 103, and encompasses a notebook computer, a desktop personal computer, a mobile information terminal, a mobile telephone, a smart phone, a tablet terminal, or the like. It is assumed that so-called Internet browser software is installed on the client 101. The client 101 is connected to the Internet 102 by a LAN, which is an access means that encompasses a network cable, such as Ethernet (registered trademark). Note that a means for accessing the network 102 is not limited to an Ethernet (registered trademark) cable, and may be configured by wireless communication means such as a wireless LAN. The Web server 103, which is described later, is provided with a similar access means. The Internet 102 is a network in which networks across the world are connected to each other, but, for example, it may be a network in which connection is only possible within a specific organization, such as an intranet.

The Web server 103 manages information stored in the site information database 104. The Web server 103 edits information of a link destination in a document file saved by the site information database 104 into a direct result frame (hereinafter, abbreviated as DRF) format corresponding to an embodiment of the invention that is a format that the client 101 can display, and provides it to the client 101. A DRF (display) in the present embodiment means a configuration for displaying by which a page of any link destination included in a page that is currently displayed by a display 207 can be previewed by using an inline frame and overlapping it on the page that is currently displayed. The Web server 103 is connected to the site information database 104 by a LAN, for example. The site information database 104 is an information processing apparatus in which predetermined database software is installed, and performs management of various data.

The site information database 104 manages information of document files for publishing a Web site on the Internet 102. In addition to HTML files and PDF files, the document files include files used by specific applications (for example, MS Word, or the like). It is possible to include information relating to a Web site owner and a product that an owner provides or the like in these document files. For example, if the Web site is a homepage of a corporation, in addition to a company overview, information for investors, and the like, information of products that the corporation manufactures/sells and other information relating to any services that the corporation provides is stored in the site information database 104. For example, in a case where a service that a corporation provides is a blog provision service, blog information that a user that receives the service provisioning creates is included. The site information database 104 is dynamically updated, and stores the latest information.

Note that, in the present specification, although for convenience the Web server 103 and the site information database 104 are explained as being realized by information processing apparatuses that are respectively physically independent, embodiments of the invention are not limited to this. For example, these may be realized by a single information processing apparatus. In contrast, the Web server 103 may be of distributively configured or redundantly configured by a plurality of information processing apparatuses. In addition, although the site information database 104 is explained as being connected to the Web server 103 by a LAN or the like, configuration may be taken to have an embodiment that can communicate with the Web server 103 via the Internet 102 or an intranet (not shown), for example. Note that, a Web site can be said to be a group of Web pages published as a whole. A Web site may be, for example, a corporate or a personal homepage, or the like.

<Information Processing Apparatus Configuration>

Figure 2:
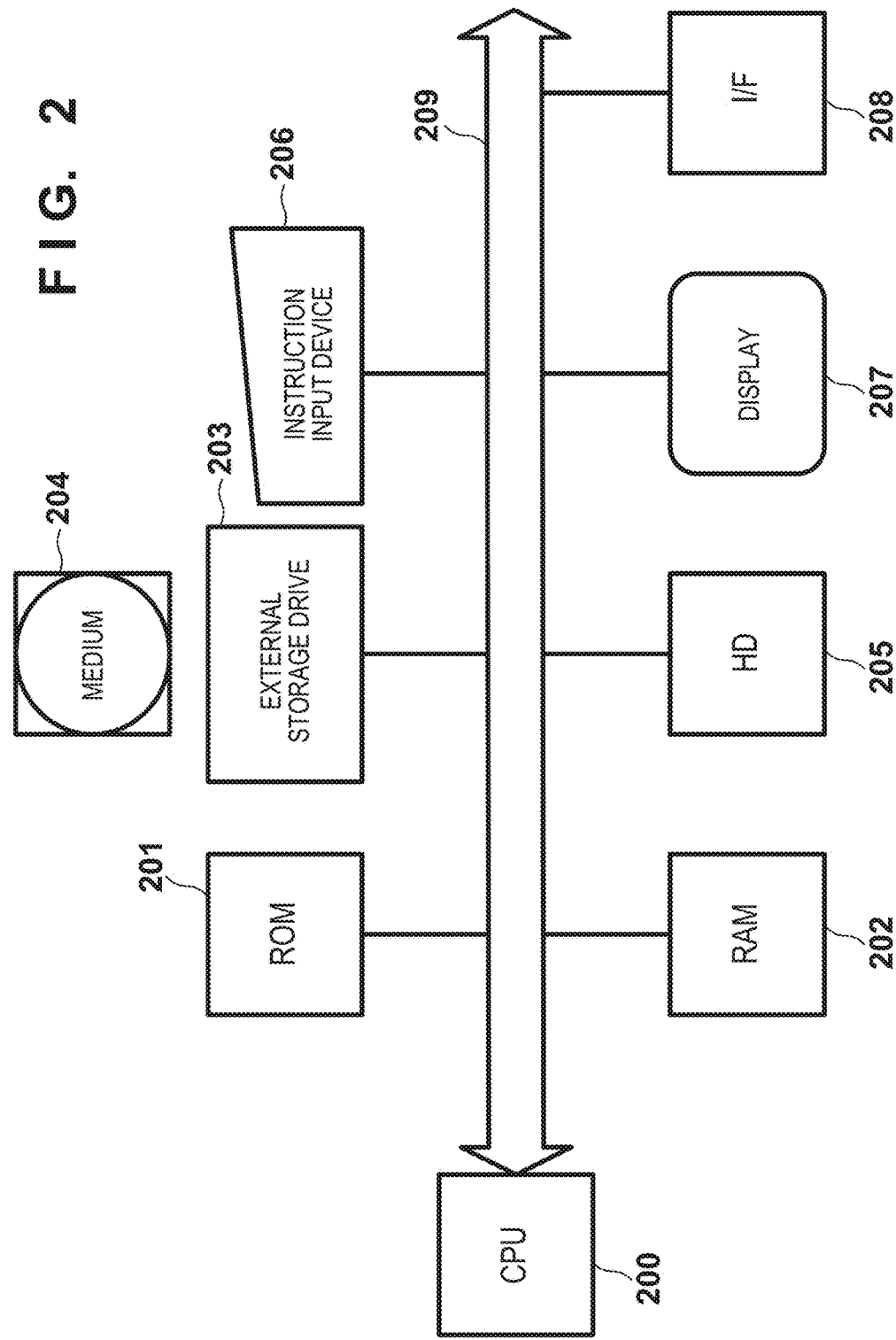
FIG. 2 is a block diagram for illustrating an example of a hardware configuration of a client 101 corresponding to an embodiment of the invention.

Next, explanation is given regarding an overview of an information processing apparatuses that configure the DRF display system corresponding to the present embodiment. FIG. 2 is a block diagram for illustrating an example of a hardware configuration of the client 101. The above described site information database 104, which is an information processing apparatus, may also be configured by a similar or equivalent hardware configuration.

In FIG. 2, a CPU 200 executes application programs, an operating system (OS), control programs, or the like, which are stored in a hard disk apparatus (hereinafter, referred to as an HD) 205, and performs control for temporarily storing files, information necessary for execution of the program, and the like, in a RAM 202. Note that processing in later described FIG. 5A to FIG. 5F is also realized by the CPU 200 controlling the device overall by executing corresponding processing programs.

A ROM 201 internally stores programs such as a basic I/O program, and various data such as font data or template data used upon document processing, or the like. The RAM 202 temporarily stores various data, and functions as a main memory, a work area or the like for the CPU 200.

An external storage drive 203 is an external storage drive for realizing access to a recording medium, and can load a program stored in a medium (a recording medium) 204 into this computer system. Note that for the medium 204, a floppy (registered trademark) disk (FD), a CD-ROM, a CD-R, a CD-RW, a PC card, a DVD, Blu-ray, an IC memory card, MO, a memory stick, or the like can be used for example.

An HD (hard disk) that functions as a large capacity memory is used for an external storage device 205 in the present embodiment. Application programs, an OS, control programs, related programs, or the like, are stored in the HD 205. Note that in place of the hard disk, a nonvolatile storage apparatus such as a Flash (registered trademark) memory may be used.

An instruction input device 206 corresponds to a keyboard, a pointing device (a mouse or the like), a touch panel, or the like. Using the instruction input device 206, a user makes an input instruction, such as a command for controlling the apparatus, to the client 101. The display 207 displays a command inputted from the instruction input device 206, and a response output of the client 101 in response to that, or the like. A system bus 209 is responsible for a flow of data in the information processing apparatus. An interface (hereinafter, referred as an I/F) 208 fulfills a role of mediating an exchange of data with an external apparatus.

Note that by software for realizing functions equivalent to those of the foregoing apparatuses, it is possible to configure alternatives to the hardware apparatuses.

Configuration may be taken such that whenever a corresponding program is caused to operate to execute processing corresponding to the present embodiment, the program is loaded from the HD 205, in which it is previously installed, into the RAM 202. Also, a program according to the present embodiment is recorded in the ROM 201, and configured so as to be a part of a memory map, and can be executed by the CPU 200 directly. Furthermore, it is possible to load a corresponding program and related data from the medium 204 into the RAM 202 directly, and cause the program to execute.

Figure 3:
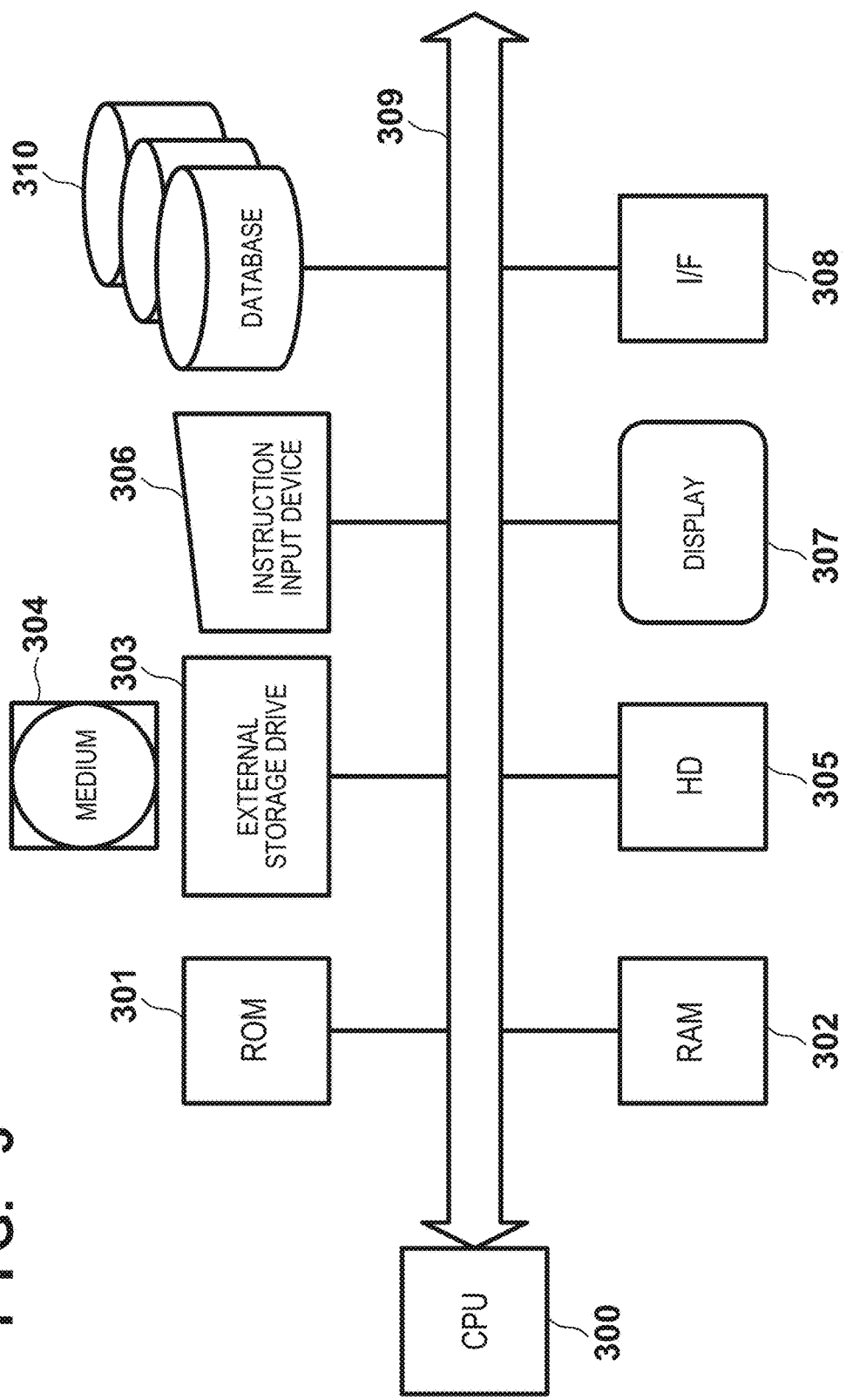
FIG. 3 is a block diagram for illustrating a device configuration of a Web server 103 corresponding to an embodiment of the invention.

FIG. 3 is a block diagram for illustrating a device configuration of the Web server 103. Regarding functions and applications of the CPU 200, the ROM 201, the RAM 202, the external storage drive 203, the medium 204, the HD 205, the instruction input device 206, the display 207, the I/F 208, and the system bus 209, and also relations therebetween, it is similar or equivalent to what is explained using FIG. 2. In FIG. 3, it is noted that a database 310 is connected to the system bus 209. Here, the database 310 indicates the site information database 104.

<Generation of DRF Display Data>

Figure 4:
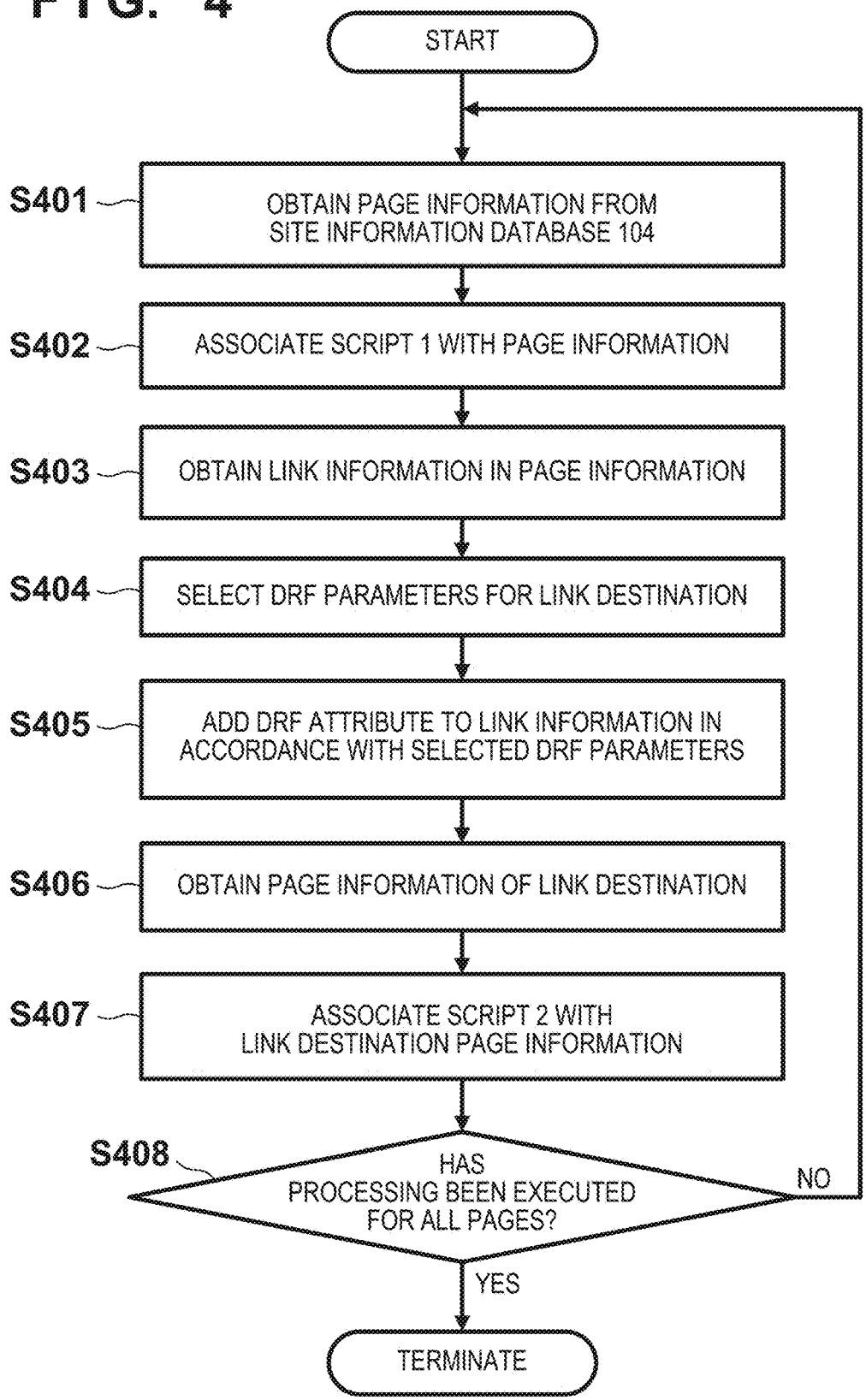
FIG. 4 is a flowchart for illustrating an example of processing for generating DRF display data in the Web server 103 corresponding to embodiments of the invention.

Next, explanation is given regarding processing for generating DRF display data based on site information corresponding to embodiments of the invention with reference to the flowchart of FIG. 4. FIG. 4 is a flowchart for illustrating an example of processing for generating DRF display data in the Web server 103 corresponding to embodiments of the invention. Processing that corresponds to FIG. 4 is realized by a CPU 300 executing a processing program that the Web server 103 holds in an HD 305 or the database 310. In addition, the performer of execution of the processing may be a DRF display data generation server that is other than the Web server 103. In that case, the server may generate DRF display data based on site information stored in the site information database 104, and save it in the site information database 104 via the Web server 103.

In FIG. 4, in step S401, page information, which is data to be processed that is stored in the site information database 104, is obtained from the Web server 103. The page information obtained here is page data of an HTML format.

Continuing, in step S402, a first script (script 1) for performing a DRF display of a page for a link destination included in the page is embedded or associated with the obtained page information. The script 1 is a script that is executed by the client 101, and performs processing to generate a DRF display inline frame (iframe) and an overlay region, based on URL information of link destinations in a <a> tag in a page. Note that embedding of the script 1 may be by directly describing the script in the page, or may be of a form that describes URL information for obtaining the script 1.

Next, in step S403, the link information in the page is obtained, and in step S404, a DRF parameter related to the link destination is selected. A DRF parameter is a parameter used for DRF display of only specific information in the page of the link destination. For the DRF parameter, "#~" may be added to a URL as a fragment identifier, or "?~" may be added to the URL as a query string. Although page data of an HTML format is generally a tree structure that uses tags, DRF parameters include, as information for narrowing down sub-trees that are included in the page data of the HTML format, at least one of a tag name, a tag ID, a class name, an attribute, text within tags, and the like, for example.

Specifically, if there is a sub-tree 1 configured by a tag description of <div id="aa1" class="bbb" xxx="yyy"> . . . </div>, for example, tag information for narrowing down to the sub-tree 1 is tag name: div, ID: aa1, class name: bbb, attribute: the attribute value is yyy for the attribute name of xxx. Also, if there is a sub-tree 2 configured by a tag description of <span id="aa2" class="bbb" xxx="zzz"> . . . </span>, for example, tag information for narrowing down to the sub-tree 2 is tag name: span, ID: aa2, class name: bbb, attribute: the attribute value is zzz for the attribute name of xxx.

Note that in the above, although id and class are types of attributes, there are the following differences. Firstly, because an ID set to id is used as an identifier in a page, setting the same value to a plurality of tags is not permitted. In addition, for class it is possible to arrange a plurality of class names separated by spaces (e.g., 'class="xxx yyy"').

In CSS or jQuery, it is possible to narrow down tags by designating this information in a format below.

'<tag name>', '#<ID>', '.<class name>', '[<attribute name>=<attribute value>]'

For example, the above sub-trees 1 and 2 can be narrowed down by designating tag information as follows.

1. If '#aa1' is set, this means a sub-tree having as a root a tag with an ID of aa1, and so narrowing down to the sub-tree 1 is performed.
2. If '.bbb' is set, this means sub-trees having as a root a tag for which bbb is set as a class name, and so narrowing down to both of sub-trees 1 and 2 is performed.
3. If 'span.bbb' is set, this means sub-trees having as a root a tag whose tag name is span and for which bbb is set as a class name, and so narrowing down to both of sub-trees 1 and 2 is performed.
4. If 'div[xxx=yyy]' is set, this means a sub-tree having as root a tag whose tag name is div and for which an attribute name xxx has an attribute value of yyy, and so narrowing down to the sub-tree 1 is performed.

In addition, regarding DRF parameters, it is further possible to include values such as below.

Values for designating an order among the narrowed down sub-trees. For example, if designating the second tag for which a class name of section is set: '.section:eq(2)'. By this, it is possible to narrow down to a sub-tree having as a root the second tag for which section is set as the class name.

A value for narrowing down to sub-trees that include a particular keyword or text in the narrowed down sub-trees. For example, if the keyword is 'exposure control': '.section: contains(exposure control)'. By this, it is possible to narrow to a tree for a tag for which 'section' is set as the class name, and in which the text 'exposure control' is included in the sub-tree, for example.

A value for narrowing down with a condition that, out of narrowed down sub-trees, a further specific tag is included in the sub-trees. For example, in the case of sub-trees in which 'exposure control' is included in specific sub-trees, '.section:has(h2:contains(exposure control))'. By this, it is possible to narrow down to a tree for a tag whose class name is set to 'section', and that is a tag for which an h2 tag is included in a child element of the tree, and the text 'exposure control' is included in a child element of the tree for that h2 tag.

Note that the aforementioned is merely an example, and in addition to the aforementioned narrowing down methods, it is possible to narrow down sub-trees by using begins-with matching or ends-with matching of an attribute value, a parent-child relationship or a sibling relationship for tags, or the like. In such a case as well, sub-trees are narrowed down by using tag names, IDs, class names, and attributes.

Because the aforementioned DRF parameters are parameters for selecting information displayed when performing a DRF display of page information of a link destination, they can be decided by a relation between the original page and the link destination page. In addition, it is also possible to select all link destination pages without selecting information. In such a case the DRF parameters are set to be blank.

Next, in step S405, in accordance with the selected DRF parameters, the DRF parameters are added to the link information in the page obtained in step S401, for example by inserting drf attributes. For example, if there is the link <a href="XXX"> . . . </a>, in a case of inserting the class name 'section' as a drf attribute, it becomes <a href="XXX" drf=".section"> . . . </a>. Note that the attribute name is not limited to drf, and another name may be used. In addition, <a href="XXX#.section"> . . . </a> or the like may be set by using the href attribute without using a special attribute.

Next, in step S406, page information of the link destination corresponding to a URL of the link information is obtained. Continuing, in step S407, a second script (script 2) is embedded or associated with the obtained link destination page information. The script 2 is a script that is executed when the client 101 displays a DRF, and information to display in the DRF is selected based on the DRF parameters that are obtained from the URL information of the link destination page by the execution. Note that embedding of the script 2 may be by directly describing the script in the page, or may be of a form that describes URL information for obtaining the script 2.

Next, in step S408, whether the aforementioned processing has been executed for all pages is determined based on the selection of the page information in step S401, and if there are unselected pages step S401 is returned to, and other pages are processed.

Next, explanation is given of detail of processing executed by the DRF display system of the invention, based on the configuration illustrated in FIG. 1 through FIG. 4.

FIG. 5A through FIG. 5F are state transition views illustrating an example of DRF display processing that corresponds to an embodiment of the invention, in accordance with an SDL (Specification and Description Language) description method. Processing that corresponds to FIG. 5A through FIG. 5F is realized by the client 101 and the Web server 103 each executing processing programs held respectively. Communication between the client 101 and the Web server 103 can be realized by using a Web browser communication function executed in the client 101, or a Web browser plugin (extension program) communication function. For example, it can be realized in accordance with an HTTP protocol using Java (registered trademark) Script. In addition, Flash or the like may be used, and the communication may be in accordance with another protocol that is not HTTP.

Figure 5B:
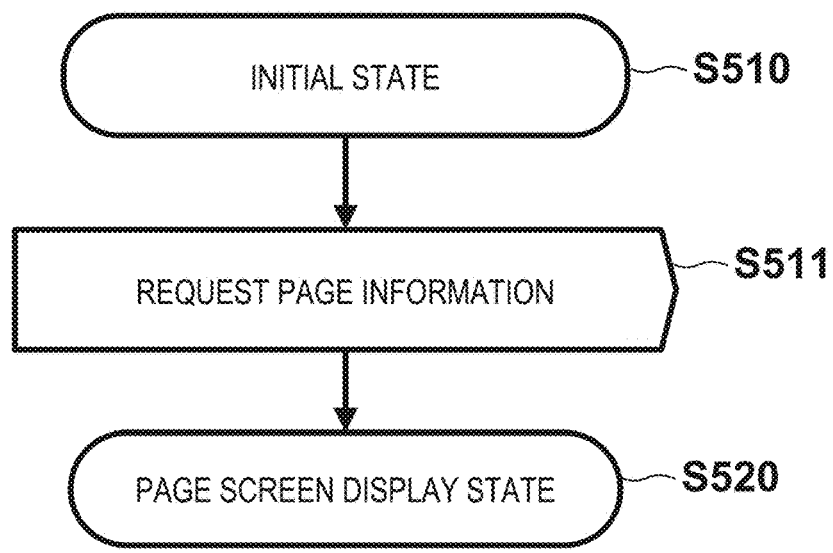
FIG. 5B is a flowchart for illustrating an example of processing in an initial state of the client 101 in the DRF display processing corresponding to embodiments of the invention.

Firstly, FIG. 5A is a view that illustrates state transitions of the client 101 and the Web server 103. In FIG. 5A, the client 101 takes states of step S510 to step S530, and processing illustrated in FIG. 5B through FIG. 5E is performed in these states respectively. In addition, the Web server 103 is in a state of waiting for a request from the client 101, and executes processing as illustrated in later described FIG. 5F in response to a request received from the client 101.

Firstly, the client 101 is in an initial state in step S510. In this initial state, a screen is not displayed on the display 207 of the client 101, and as illustrated in FIG. 5B, in step S711 a page information request for a predetermined Web page is transmitted to the Web server 103, for example. Thereafter, transition is made to a page screen display state of step S520.

Figure 5C:
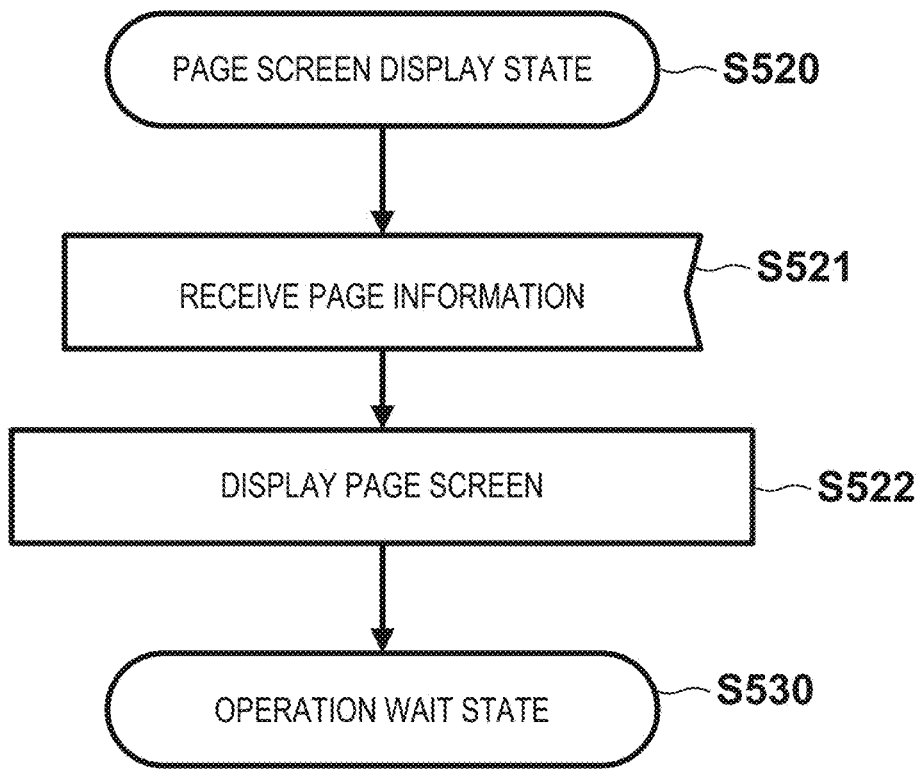
FIG. 5C is a flowchart for illustrating an example of processing in a page screen display state of the client 101 in the DRF display processing corresponding to embodiments of the invention.

In the page screen display state of step S520, as illustrated in FIG. 5C, the client 101 receives page information from the Web server 103 in step S521. Next, the processing proceeds to step S522, the received page information is displayed on the display 207, and transition is made to an operation wait state in step S530.

Figure 6B:
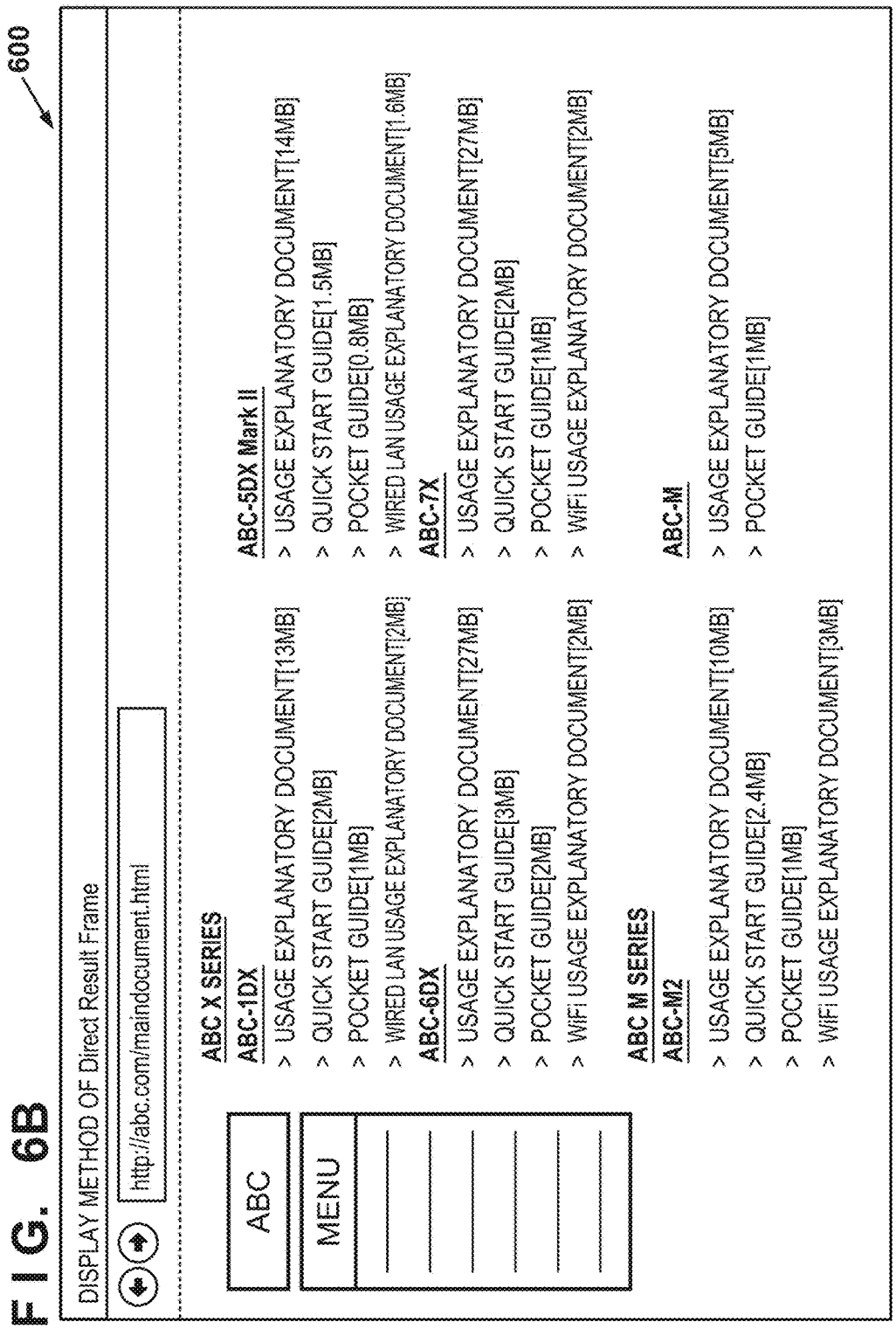
FIG. 6B is a view for illustrating an example of a window display of a link destination page corresponding to embodiments of the invention.

An example of a display screen at this point is as illustrated in FIG. 6A. In FIG. 6A, a plurality of link displays 601 to 605 are displayed in a screen 600. Note that, if these pieces of link information are clicked, a page of a link destination included in the page information is displayed in the screen 600. An example of such a display screen is as illustrated in FIG. 6B. Here, an example in which a page of URL:http://abc.com/maindocument.html is displayed is illustrated. Note that, in the present embodiment, because differences in a DRF display configuration in accordance with values of DRF attributes are explained, the link destination page is explanatorily the same for the link displays 601 to 605.

Next, in the operation wait state of step S530, as illustrated in FIG. 5D, in step S531, if the client 101 detects an operation with respect to any of the link displays 601 to 605 in the page display state as illustrated in FIG. 6A, if the operation is a page transition operation for causing the link destination page to be displayed replacing the current display page, or for causing the link destination page to be displayed in a separate window, a transition is made to step S536, and if a DRF display operation for causing the link destination page to be DRF displayed, a transition is made to step S532.

As methods for a page transition operation and a DRF display operation, for example it is possible to accept a page transition operation as a click operation in which the user uses a mouse or the like, and it is possible to accept a DRF display operation as a mouseover operation. Note that a mouseover operation means an operation by which a mouse cursor displayed on the display 207 overlaps a link display. In addition, it is possible to accept a one click (a single click) operation as a DRF display operation, and a successive two-click (a double-click) operation as a page transition operation. Note that a page transition operation may be accepted by a single click operation, and a DRF display operation may be accepted by a double-click operation. Furthermore, if a touch panel is used as the instruction input device 206, a single tap operation may be allocated to a DRF display operation, and a double tap operation to a page transition operation, or the reverse. In addition, the DRF display operation and the page transition operation may be made to not be different things, and for example, even if they are the same operation, an operation with respect to a display link for which there has not been a DRF display is interpreted as a DRF display operation, and for a display link which there already has been a DRF display it is interpreted as a page transition operation.

Firstly, in step S532, it is determined whether a drf attribute is set in link information of a link display detected by the DRF display operation. If not set, because the link display is not a target of a DRF display by the DRF display operation, step S531 is returned to and the processing continues. In contrast, if a drf attribute is set, the script 1 embedded in the page is executed, and the processing transitions to step S533. Note that, in the present embodiment, it is assumed that a drf attribute is not set in the link display 601, and drf attributes are set in the link displays 602 to 605.

In step S533, the Web server 103 is requested for the page information of the link destination, in accordance with the link information. Specifically, the script 1 generates a URL that is set to a src attribute value of an iframe element for generating an inline frame in accordance with values of the drf attribute and the href of the link information in the page information. For example, if the link information is <a href="XXX" drf="section">...</a>, a tag for DRF display becomes <iframe src="XXX#.section"></iframe>.

Next, in step S534, the link destination page information transmitted from the Web server 103 in response to the request is received. Next, in step S535, in accordance with the value set by the drf attribute, the script 1 and the script 2, which is embedded in the link destination page information, are executed to perform a DRF display of the page information in the screen 600, and a transition is made to the operation wait state of step S530.

Also, in step S536, the Web server 103 is requested for link destination page information in accordance with the link information of the link display for which the page transition operation was performed. Here, a request is made for page information based on a URL in accordance with the value of an href of the link information in the page information. Next, in step S537, the link destination page information transmitted from the Web server 103 in response to the request is received. Next, in step S538, the received link destination page information is normally displayed in the screen 600 by switching it with the original page, and a transition is made to the operation wait state of step S530. At that time, the page may be switched to and displayed in the same window as the window in which the original page is displayed, or may be displayed in a different window.

Figure 5E:
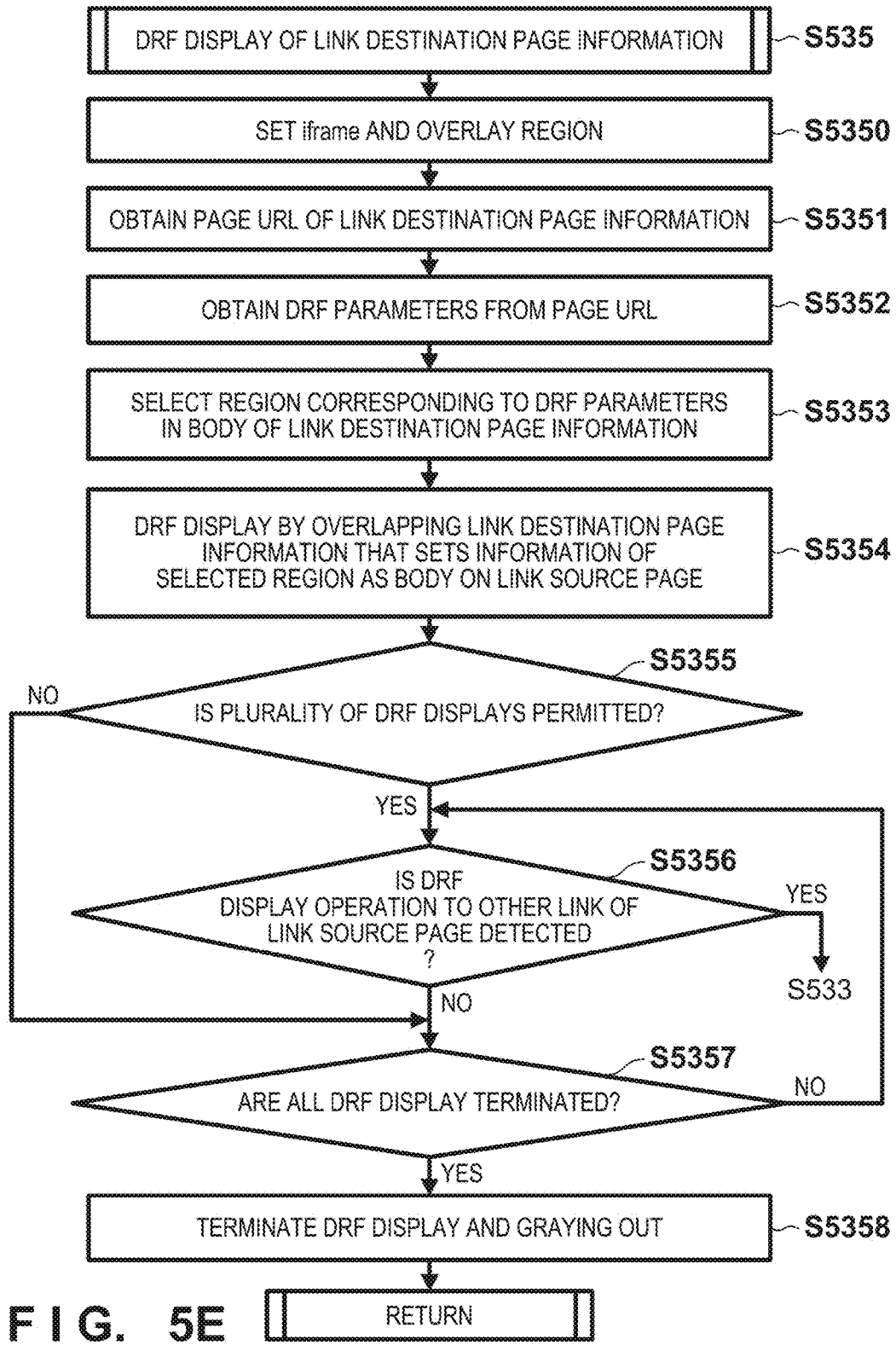
FIG. 5E is a flowchart for illustrating an example of DRF processing of page information of a link destination of the client 101 in the DRF display processing corresponding to embodiments of the invention.
Figure 5F:
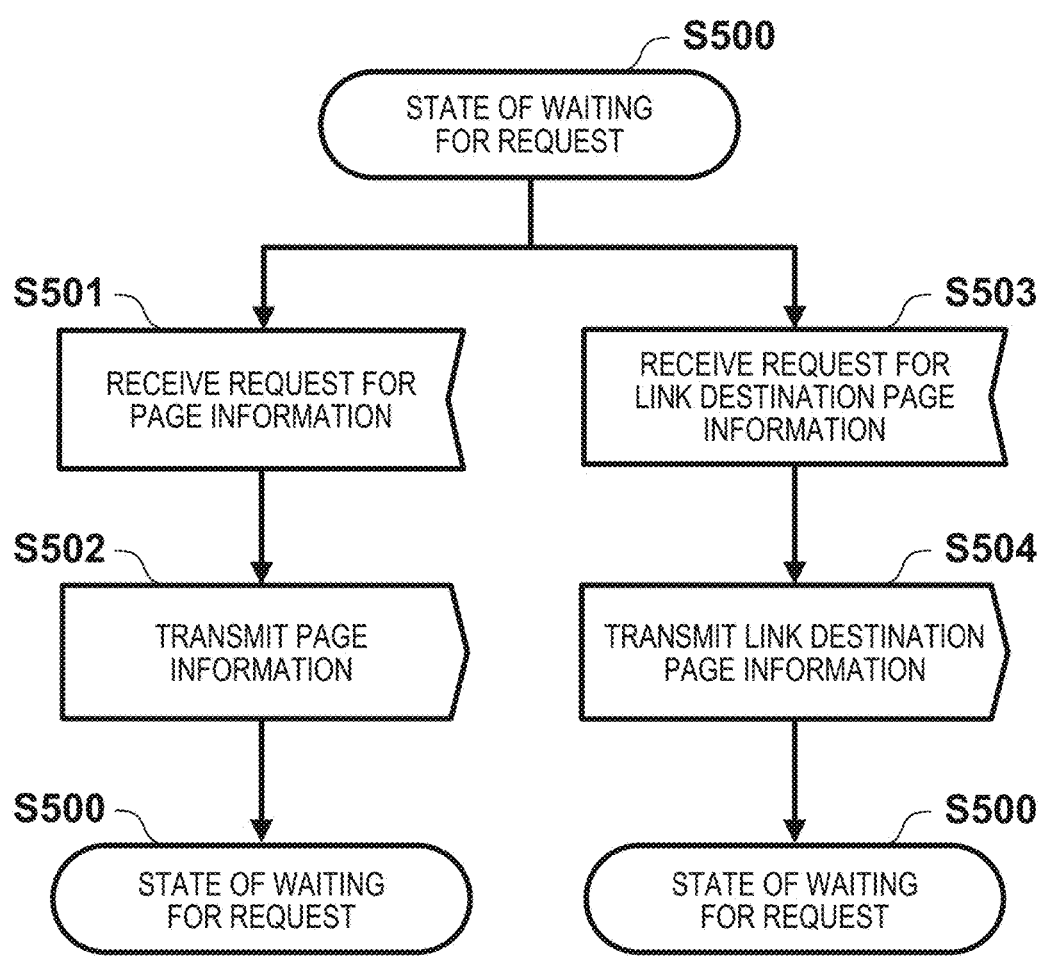
FIG. 5F is a flowchart for illustrating an example of processing in a state of waiting for a request of the Web server 103 in DRF processing corresponding to embodiments of the invention.

Subsequently, explanation is given of the details of the DRF display processing in step S535 above with reference to FIG. 5E. This processing is processing that is realized by executing the script 1 and the script 2, which are respectively embedded (or obtained in accordance with an obtainment URL designated in the page) in the link source page and the link destination page.

Firstly, in step S5350, the script 1 is executed to set an inline frame (iframe) corresponding to the direct result frame (DRF), which is to be displayed over the page currently being displayed, and an overlay region, which is a region other than the DRF. In the present embodiment, the overlay region is grayed out. Gray-out processing can be realized by creating a layer that is semi-transparent, is the same size as the page overall, and has a background color of gray, for example, and after arrangement so as to cover the page overall, designating a z-index to be high. Note that, if a setting that permits a plurality of DRF displays is not made, graying out is not performed, or the overlay region is set so that all of the link source page other than the region in which the DRF frame is displayed is grayed out. However, if a plurality of DRF displays is permitted, an overlay region is set so as to gray out other than the link displays in the link source page. Regarding this setting, for a page that includes a plurality of links, for example, a user can use a predetermined setting screen to set in advance whether to permit a plurality of DRF displays. Alternatively, it is possible to set in advance whether to permit a plurality of DRF displays in the script 1, which is embedded in the page information.

Specifically, explanation is given below of DRF display processing that uses an inline frame. Subsequent DRF display processing is realized by executing the script 2, which is embedded in a link destination page to be DRF displayed. Firstly, in step S5351, a URL of the link destination page information itself is obtained. For the URL, the one used in the page request in step S533 may be used. Next, in step S5352, the DRF parameters in the page URL are obtained. The DRF parameters may be obtained from fragment identifiers, or may be of a form in which they are obtained from a query string. Furthermore, in step S5353, a region corresponding to the DRF parameters obtained from the body (the region sandwiched between the <body> tags) of the link destination page information is selected. Specifically, a region satisfying conditions indicated by the DRF parameters is specified from regions for which a <div> tag has been added. For example, if the DRF parameters are '.section:has(h2:contains(exposure control)', a region that is a tag whose class name is set to 'section' and in which an h2 tag is included in child elements of its tree, and also in which 'exposure control' is included in the child elements of the tree of the h2 tag is selected.

Figure 6C:
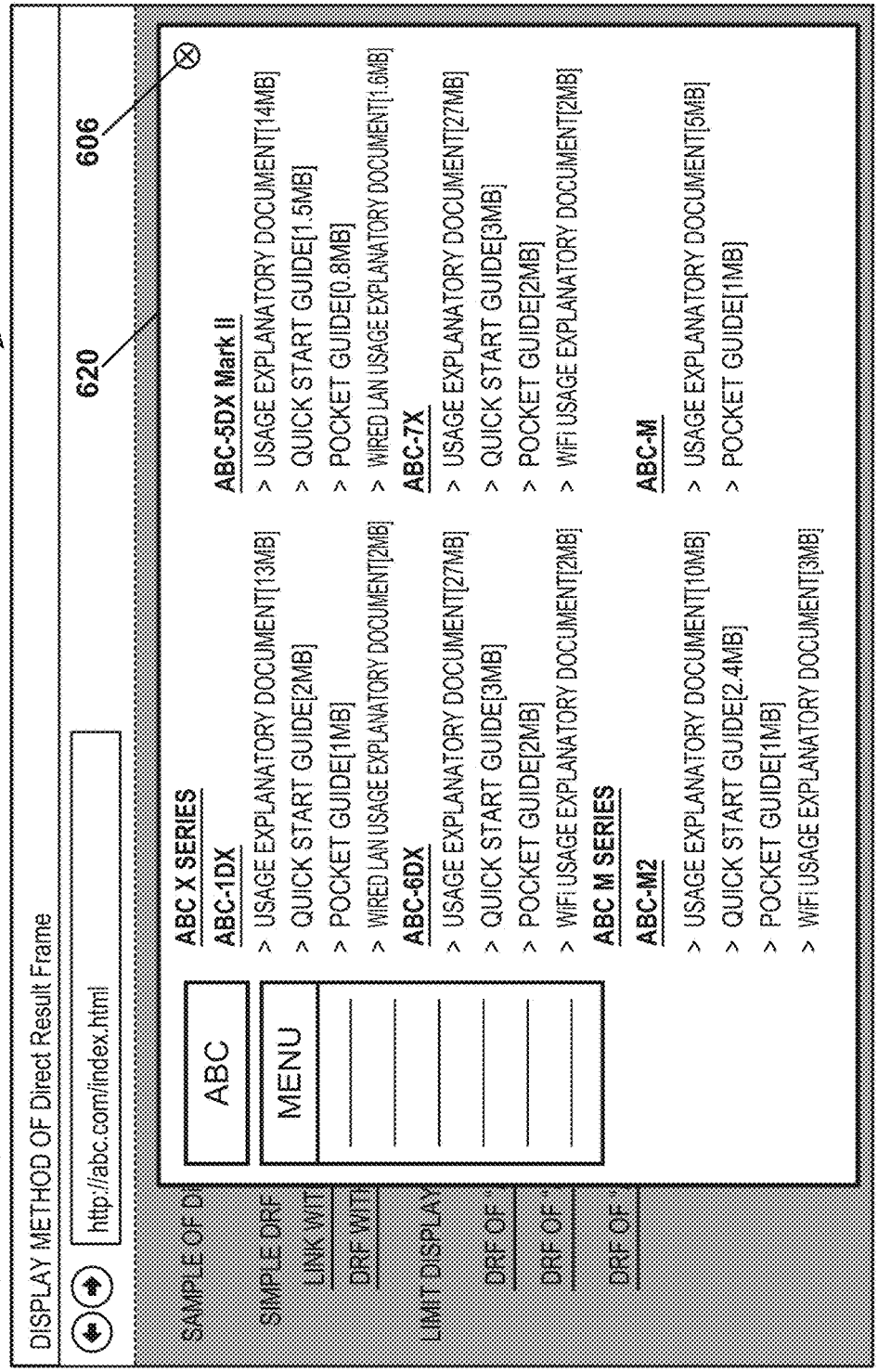
FIG. 6C is a view for illustrating an example of a DRF display corresponding to embodiments of the invention.
Figure 6D:
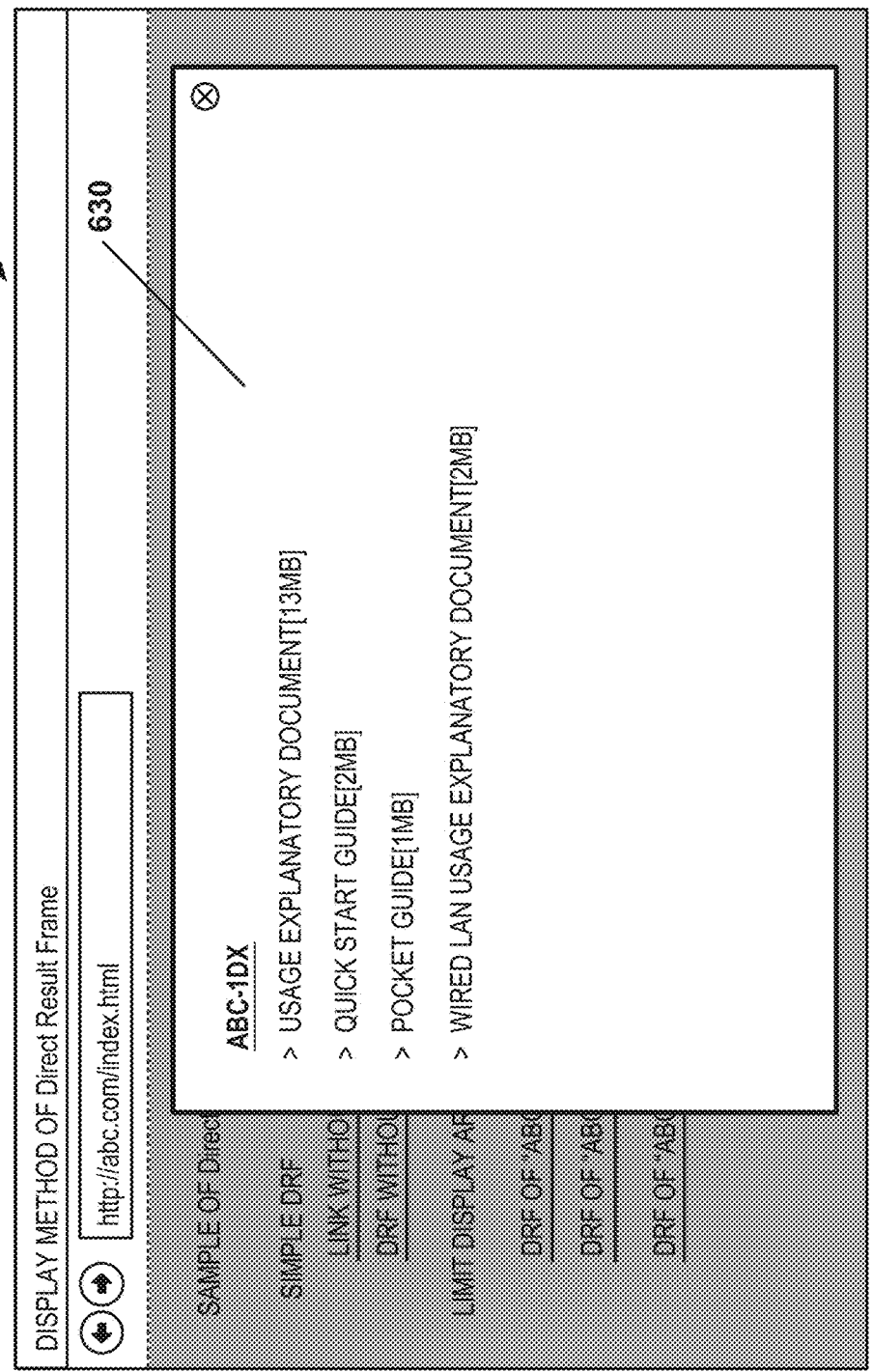
FIG. 6D is a view for illustrating another example of a DRF display corresponding to embodiments of the invention.

Next, in step S5354, a DRF display is performed by overlapping the link destination page information, which has as a body the information of the selected region, in an inline frame on the display of the link source page. Display examples for this point are illustrated in FIG. 6C through FIG. 6F. FIG. 6C is a DRF display example for when the link display 602 is selected, illustrates a case in which the drf attribute values are blank, and in such a case all information in the page is DRF displayed in the frame 620. Note that a button 606 is a button for closing the frame 620 that is DRF displayed. By a click of the button 606 the script 1 is stopped, the frame 620 is closed, the graying out terminates, and the screen of FIG. 6A is returned to. FIG. 6D is a DRF display example for when the link display 603 is selected, and illustrates a case in which only information of a product 'ABC-1DX' is selected and displayed in a frame 630. The DRF parameter in such a case is '.col2Float:first' for example, designates the first tag whose class name is set to col2Float, and a corresponding recitation of a region in relation to ABC-1DX is as follows, for example.

```
<div class="col2Float">
    <h3><span class="txt">ABC-1D X</span></h3>
    <ul>
        <li><a href="http:xxx>usage explanatory document></a>[13MB]</li>
        <li><a href="http:xxxx>quick start guide></a>[2MB]</li>
        <li><a href="http:xxxxx>pocket guide></a>[1MB]</li>
        <li><a href="http:xxxxxx> wired LAN usage explanatory document></a>[2MB]</li>
    </ul>
</div>
```

Figure 6E:
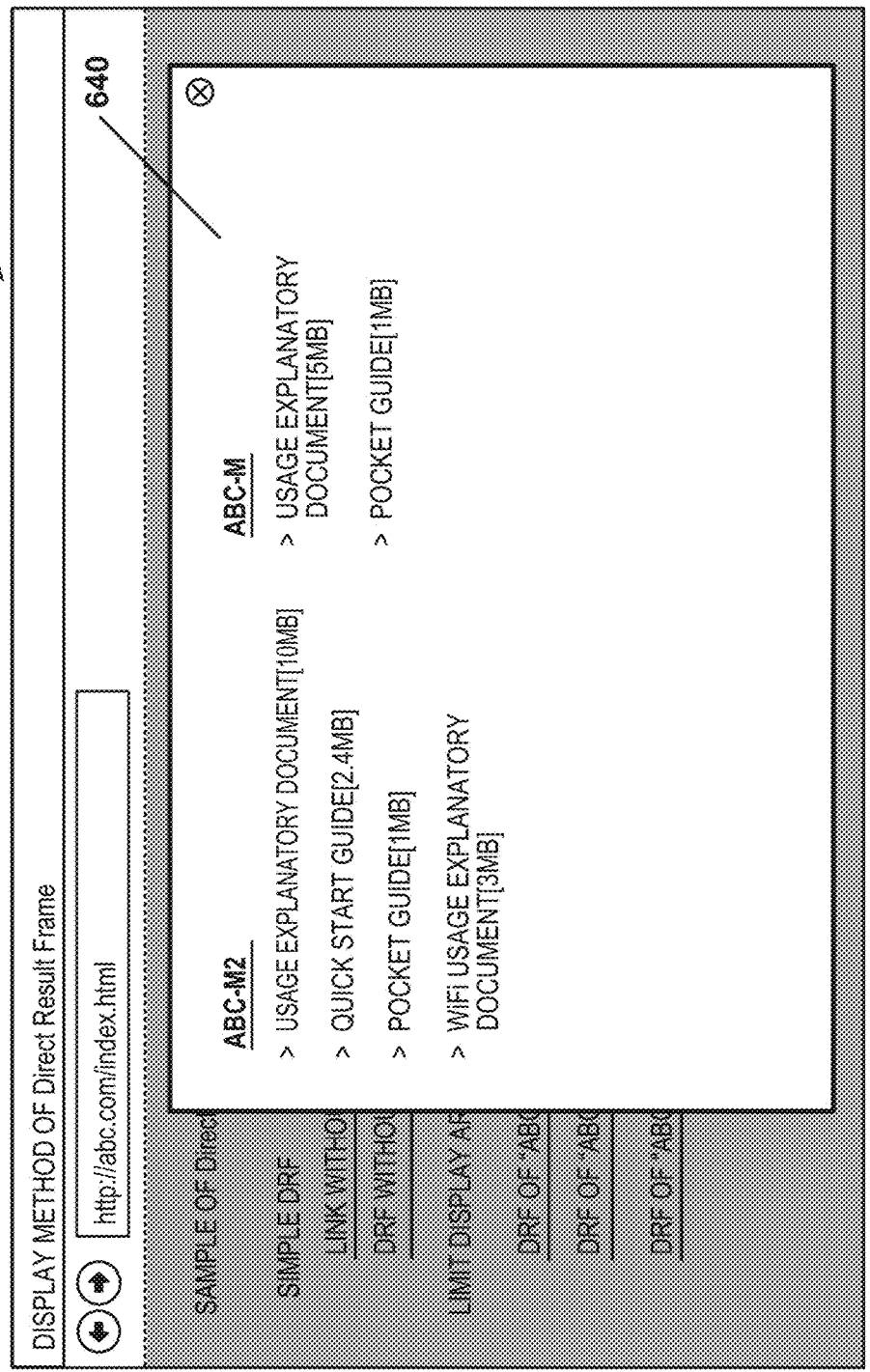
FIG. 6E is a view for illustrating another example of a DRF display corresponding to embodiments of the invention.

Next, FIG. 6E is a DRF display example for when the link display 604 is selected, and illustrates a case in which product series of ABC M series is displayed in a frame 640. The DRF parameter in such a case is '.linkList4:has(h2:contains(ABC M series))' for example, and designates a tag for which the class name linkList4 is set, and in which an h2 tag is included in a child element of its tree, where 'ABC M series' is included in a child element of the tree of the h2 tag. A recitation of a corresponding region is as follows, for example.

```
<div class="linkList4">
    <h2><span class="txt">ABC M series</span></h2>
    <a name="eos_m">
    <div class="col2">
    <div class="col2Float">
    <h3><span class="txt">ABC M2</span></h3>
    <ul>
        <li> <a href="http:nnn>usage explanatory document></a>[10MB]</li>
        <li> <a href="http:nnnn>quick start guide></a>[2.4MB]</li>
        <li><a href="http:nnnnn>pocket guide></a>[1MB]</li>
        <li> <a href="http:nnnnnn> WiFi usage explanatory document> </a>[3MB]</li>
    </ul>
    </div>
    <div class="col2Float">
    <h3><span class="txt">ABC M</span></h3>
    <ul>
        <li> <a href="http:mmm>usage explanatory document></a>[5MB]</li>
        <li> <a href="http:mmmm>pocket guide></a>[1MB]</li>
    </ul>
    </div></div>
```

Figure 6F:
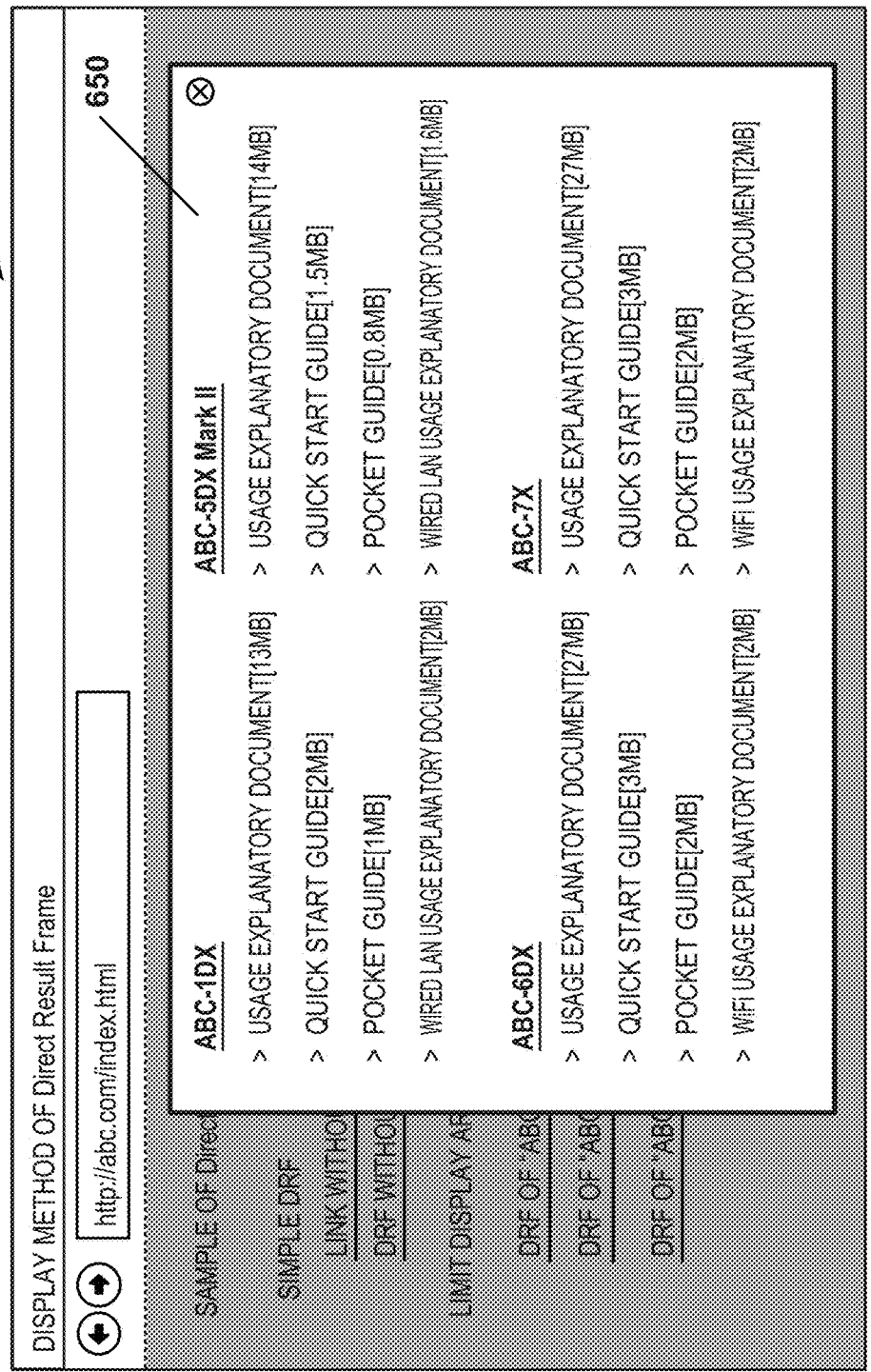
FIG. 6F is a view for illustrating another example of a DRF display corresponding to embodiments of the invention.

Next, FIG. 6F is a DRF display example for when the link display 605 is selected, and illustrates a case in which product series of ABC X series is displayed in a frame 650. The DRF parameter in such a case is '.linkList4:has(h2:contains(ABC X series))' for example, and designates a tag for which the class name linkList4 is set, and in which an h2 tag is included in a child element of its tree, where 'ABC X series' is included in a child element of the tree of the h2 tag. A recitation of a corresponding region is similar to that of the aforementioned ABC M series, so it is omitted.

Figure 7A:
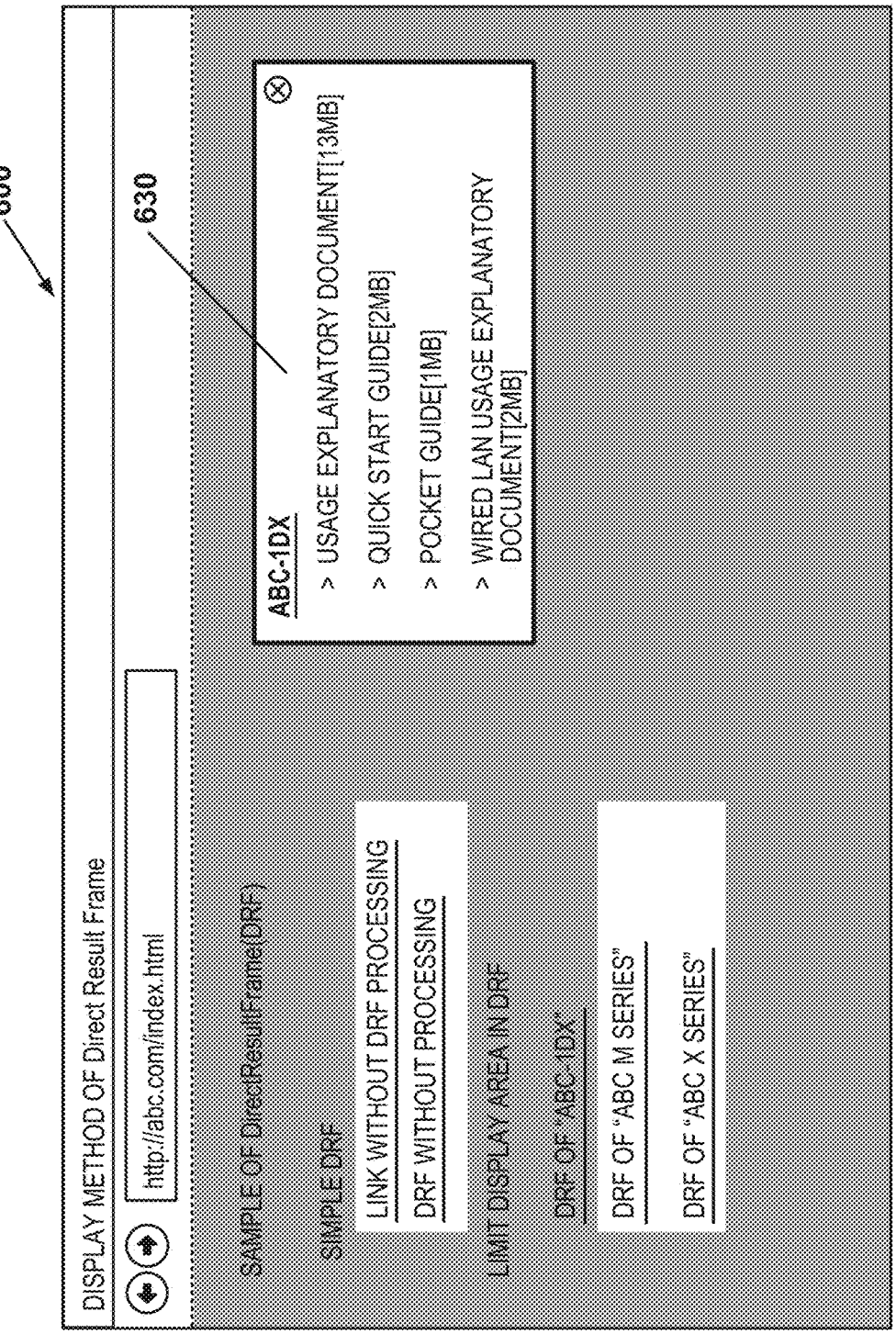
FIG. 7A is a view for illustrating example of displaying in a case of performing a plurality of DRF displays corresponding to embodiments of the invention.
Figure 7B:
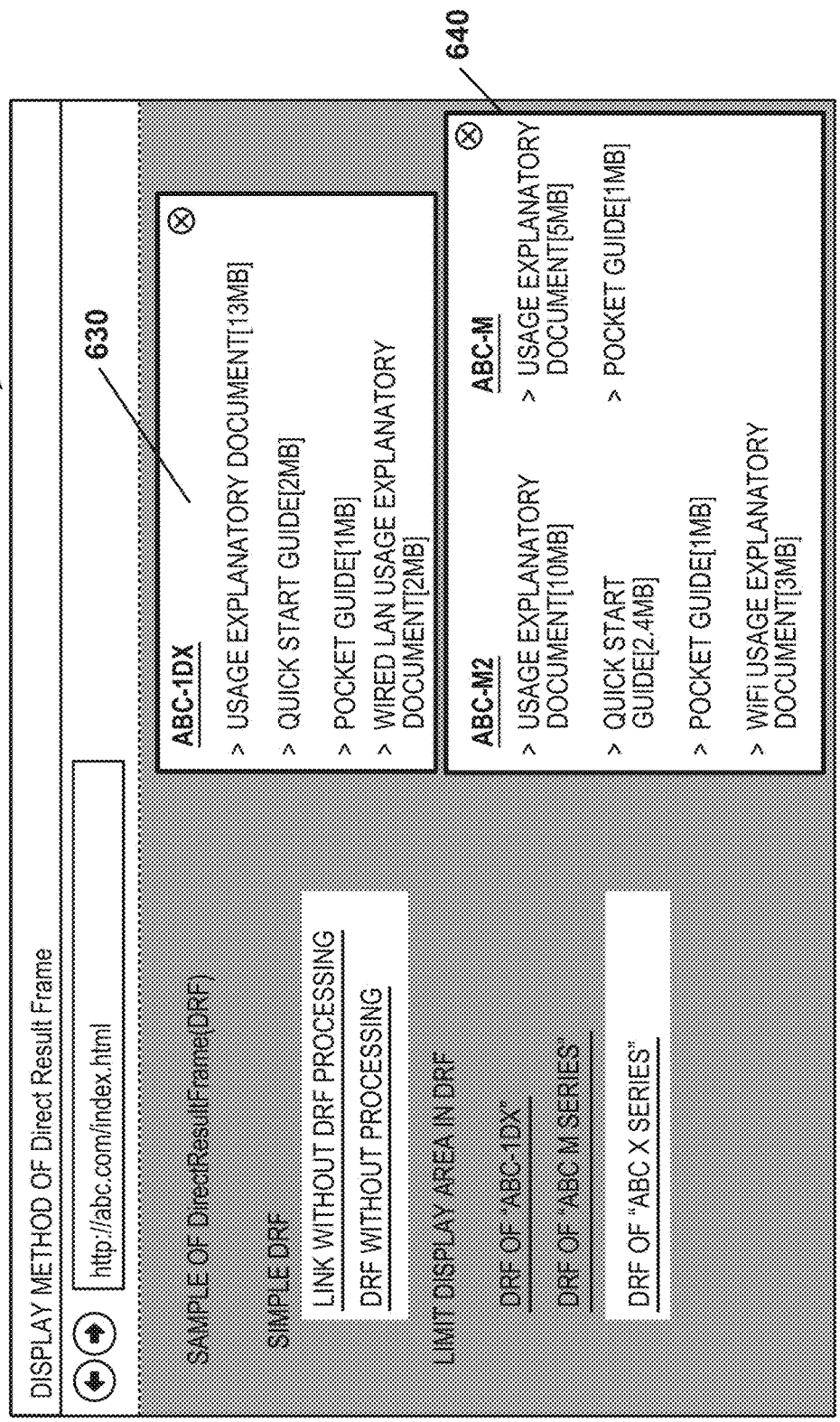
FIG. 7B is a view for illustrating another example of displaying in a case of performing a plurality of DRF displays corresponding to embodiments of the invention.

Returning to FIG. 5E, in the following step S5355, it is determined whether a plurality of DRF displays is permitted. If display of a plurality of DRFs is permitted, transition is made to step S5356. In contrast, if not permitted, transition is made to step S5357. Note that the display forms illustrated in FIG. 6C through FIG. 6F correspond to cases in which display of a plurality of DRFs is not permitted, and, in the case in which display of a plurality of DRFs is permitted, outside of the link displays in the link source page is grayed out as illustrated in FIG. 7A or FIG. 7B. FIG. 7A illustrates a case in which only the link display 603 is selected and DRF displayed in the frame 630. In such a case, link displays 601, 602, 604, and 605, which are unselected (unoperated), are not grayed out and furthermore can be selected. However, the selected link display 603 is grayed out. Alternatively, configuration may be taken to not gray out the link displays, distinguishably display the selected and unselected DRF supporting links, and perform a page transition in accordance with a page transition operation for a selected link. For example, configuration may be taken to display a selected link as normal, but to highlight an unselected DRF-supporting link. Note that an icon of the link display 603 may be displayed together with the frame 630 of the DRF display. Alternatively, the two may be associated such as by displaying to partially combine the frame 630 with the link display 603, displaying them in a caption, or the like.

Next, in step S5356, it is determined whether a DRF display operation to another link of the link source page that has not been grayed out is detected. If a DRF display operation is detected, step S533 is returned to, and processing continues. FIG. 7B illustrates an example of displaying in a case in which another link is selected. FIG. 7B illustrates a case in which in addition to the link display 603, the link display 604 is selected and DRF displayed additionally in the frame 640. In such a case, the link display 604 is grayed out and unselected link displays 601, 602, and 605 are not grayed out, and can be further selected. Note that, in the aforementioned example, although a restriction is not put on a number of frames to DRF display, limitation may be made to a predetermined number (for example, three frames). In such a case, all links may be grayed out if a corresponding number of frames is reached. However, if thereafter the button 606 is operated to close one of the frames, graying out of the link is canceled, and it becomes possible to select a link display of a link that is not DRF displayed. Alternatively, one of the displayed DRF frames (for example, a frame displayed first) may be closed, and a page corresponding to the link display that is further operated DRF displayed in a case where unselected link displays are not grayed out and a DRF display operation is performed with respect to another link display in a state where an upper limit is reached.

If a DRF display operation is not detected in step S5356, step S5357 is proceeded to, and it is determined whether DRF displays are all terminated. Termination of the DRF displays is determined based on whether the button 606 of the displayed DRF display frames has been selected, and all frames have been closed. If even one frame remains, processing by step S5356 is returned to (note that even if a plurality of DRF displays is prohibited, there is no problem because just "NO" is selected in step S5356). If it is determined that all DRF displays have terminated in step S5357, DRF displays and graying out are terminated in step S5358, the screen of FIG. 6A is returned to, and transition is made to the operation wait state of step S530 again.

Note that, in the aforementioned embodiment, a display form that excludes unselected links from graying out as in FIG. 7A was limited to a case in which a plurality of DRF displays are permitted, but configuration may be taken such that display is possible even in the case where they are not permitted. In such a case, if a new link is selected, the display target is switched to the newly selected link destination page information. In other words, although ordinarily only one DRF display frame is displayed, by successively selecting link destinations, it is possible to switch a page to display in the frame.

In addition, although in the above it is possible to terminate a DRF display by operating the button 606, termination of the DRF display may be performed in accordance with a condition other than a button operation. For example, it is possible to set a predetermined display time in advance, and terminate the DRF display when the time has elapsed. Alternatively, configuration may be taken to terminate if a predetermined operation is performed with respect to a region other than that the frame in which the DRF display is performed (for example, a click operation), or a predetermined key input (for example, input or the like of an esc key) is performed.

Furthermore, in the foregoing embodiment, a display position of a DRF display inline frame can be changed in accordance with a user operation, and in the frame it is possible to click on a link or perform a page scroll. If a link within the frame is clicked on, it is accepted as a normal page transition operation ('page transition' in step S531), and a link destination page may be displayed in a different window, for example. In addition, similarly to a normal window, it is also possible to use the edge or corners of the frame to change the display size.

Next, explanation is given of processing of a Web server 103 side. In step S700 of FIG. 5F, the Web server 103 is initially placed in a state of waiting for a request. In this state of waiting for a request, the Web server 103 receives the page information request transmitted in step S511 from the client 101, and the request for link destination page information transmitted in either step S533 or step S536. Firstly, upon receiving the page information request in step S501, in step S502 the requested page information is obtained from the site information database 104 and transmitted to the client 101. Subsequently, the state of waiting for a request of step S500 is returned to. Furthermore, upon receiving a link destination page information request in step S503, transition is made to step S504, the requested link destination page information is obtained from the site information database 104 and transmitted to the client 101, and the state of waiting for a request of step S500 is returned to.

By virtue of the above embodiment, when a predetermined page is displayed in a browser, it is possible to confirm details and information of a page of a link destination included in the page by a DRF display that uses an inline frame, without switching the screen by a click. In addition, because the number of frames for which a DRF display is possible is not limited to one, it is possible to display a plurality of frames simultaneously to compare information of link destinations. It is possible to display all information of the link destination, and, alternatively, it is also possible to select particular information to display.

For example, in a case in which it is desired to compare pages that introduce products of a manufacturer, often pages that introduce products are typically created based on the same items so as to enable comparison. Accordingly, when performing a DRF display of a link destination, by setting the same items to drf attributes of the link destinations, it is possible to easily compare information of particular items of a plurality of link destination pages. Explanation is given of this effect with reference to FIG. 8A through FIG. 8C.

Figure 8A:
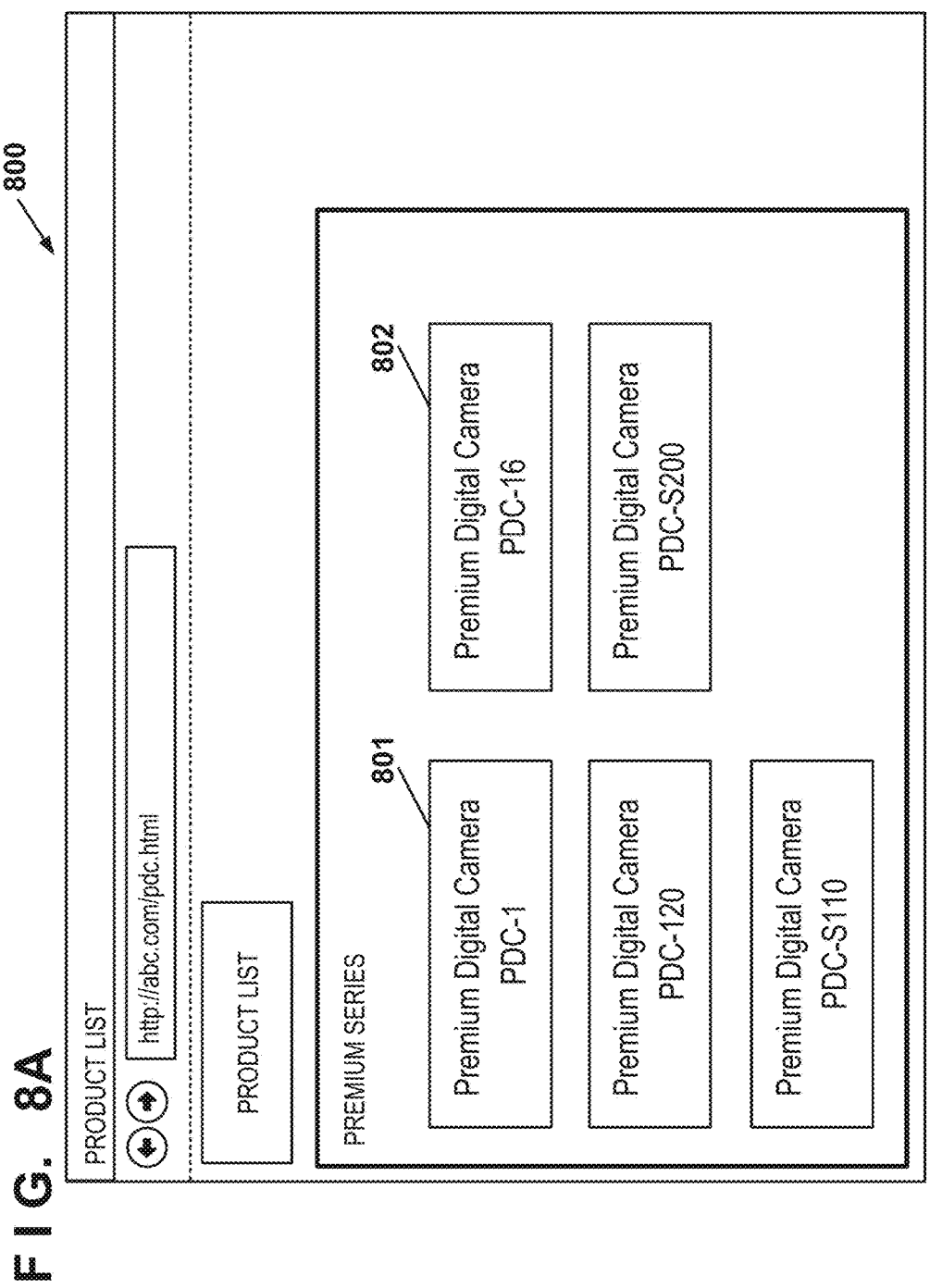
FIG. 8A is a view for illustrating an example of a window display of page information of a link source corresponding to embodiments of the invention.
Figure 8B:
FIG. 8B is a view for illustrating an example of a window display of one piece of page information out of link destinations having common items corresponding to embodiments of the invention.

FIG. 8A is a product listing page, and icons indicating five types of cameras in a bundle called Premium Series is displayed. Details of each camera are displayed by clicking a corresponding icon, but by using the DRF of the invention it is possible to compare information of a plurality of cameras without clicking. For example, if the link 801 is clicked, an example of a screen displayed is illustrated in FIG. 8B. In FIG. 8B, detailed information regarding a camera called PDC-1 is displayed. Here, as product introduction items there are the large items of "overview", "basic information", and "main features", and medium items that belong to each large item; it is assumed that these items are essentially common to the product introduction of the premium series. In such a case, if the drf attributes of the five link destinations of FIG. 8A are made to be common, it is possible to compare information relating to the common items in a plurality of DRF displays. For example, in a case of selecting 'main features' (in such a case it is possible to set the drf attributes to '.section:has(h2:contains(main features)'), for two cameras PDC-1 and PDC-16 as illustrated in FIG. 8C, it is possible to compare 'main features' by two DRF displays 803 and 804.

Figure 8C:
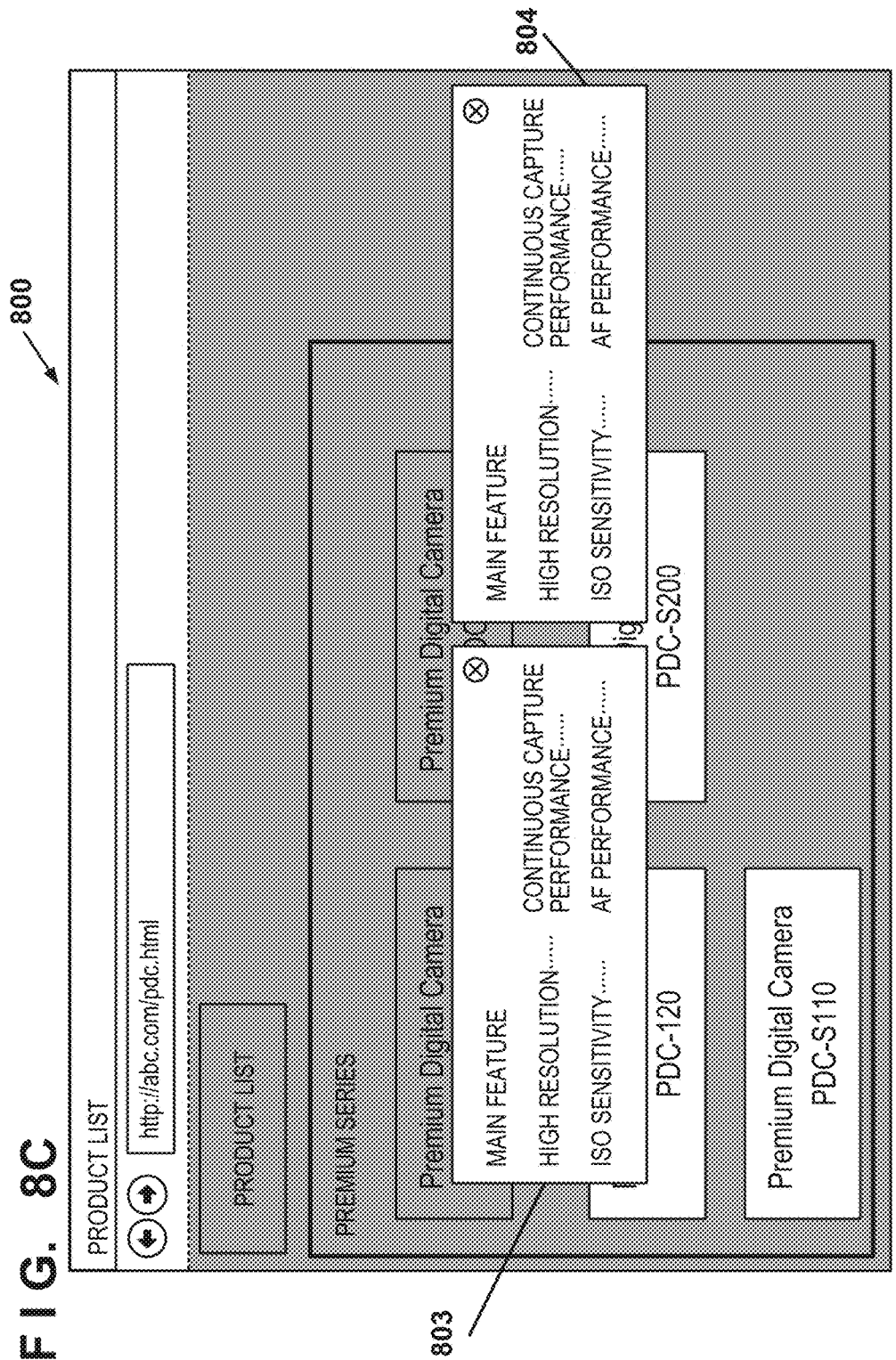
FIG. 8C is a view for illustrating an example of a DRF display of page information of link destinations having common items that narrows down display items corresponding to embodiments of the invention.

In addition although in FIG. 8C DRF displays that narrow down to particular items are performed, a DRF display of all page information of a link destination may be performed as illustrated in FIG. 8D, and in such a case a user can perform a comparison for any item by using scroll bars 805 to scroll information in each DRF frame.

By causing the above processing (for example, the processing or the like in accordance with the flowcharts illustrated by the aforementioned FIG. 4, and FIG. 5A through FIG. 5F) to be stored as a computer program in a predetermined storage medium and causing a computer to read (causing installation or copying) the program that has been stored in the storage medium, the computer can perform the above processing. Accordingly, it is clear that a computer program and a storage medium are within the scope of the invention. In addition, the invention is not limited to the aforementioned embodiments, and various changes and transformations are possible without deviating from the spirit and scope of the invention. Accordingly, the following claims are attached to make public the scope of the invention.

The invention claimed is:

1. An information processing apparatus that receives a link source page file including a plurality of links from a Web server, and displays the link source page file, the information processing apparatus comprising:
   a processor;
   a memory;
   a display unit; and
   a program stored in the memory including instructions which, when executed by the processor, cause the information processing apparatus to perform:
   displaying on the display unit the link source page file received from the Web server;
   in response to detecting a frame display operation with respect to any of the plurality of links included in the link source page file displayed on the display unit, receiving from the Web server a page file of the link destination of the link that was operated;
   performing a frame display on the display unit of the received page file of the link destination in a first frame overlapped on the display of the link source page file;
   in response to detecting the frame display operation with respect to another link that has not been operated out of the plurality of links while the first frame is overlapped on the display of the link source page file, receiving from the Web server a page file of the other link destination of the other link that was operated; and
   while maintaining the display of the first frame, performing the frame display on the display unit of the received page file of the other link destination in a second frame that is different from the first frame and is overlapped on the display of the link source page file,
   wherein the first frame and the second frame display some of information commonly included in respective page files of the link destinations to be displayed,
   in the performing a frame display on the display unit of the received page file, the link source page file is grayed out,
   while the link source page file is grayed out, the plurality of links that the link source page file includes are excluded from the graying out and are selectable,
   while a predetermined number of frames are displayed on the display unit wherein a number of frames displayed by overlapping on the display of the link source page file is limited to the predetermined number, the link source page file including the plurality of links is grayed out, and
   in response to closing at least one of the predetermined number of frames, the plurality of links are re-excluded from the graying out.

2. The information processing apparatus according to claim 1, wherein
   the some of the information is narrowed down based on a parameter included in link information in the page file of the link source,
   the parameter includes information for narrowing down sub-trees in a page file, and
   in performing a frame display on the display unit of the received page file,
   information of a sub-tree narrowed down by information for narrowing down the sub-trees out of the page file of the link source is displayed in a frame on the display unit.

3. The information processing apparatus according to claim 2, wherein the information for narrowing down the sub-trees further includes at least information that designates any of an HTML tag name, a tag ID, a class name and an attribute, and text in a tag.

4. The information processing apparatus according to claim 1, wherein while the plurality of links are excluded from the graying out and are selectable, links for which the frame display operation has already been performed, and unoperated links are displayed respectively distinguishable.

5. The information processing apparatus according to claim 1, wherein the instructions which, when executed by the processor, cause the information processing apparatus to further perform:
   detecting a page transition operation with respect to a link in the link source page file corresponding to a page file of a link destination displayed in the frame, while the link source page file is grayed out,
   receiving the page file of the link destination from the Web server, and
   switching the display of the link source page file and the frame to a display of the page file of the link destination for which the page transition operation was performed.

6. The information processing apparatus according to claim 1, wherein the instructions which, when executed by the processor, cause the information processing apparatus to further perform:
   in response to further detecting a frame display operation with respect to another unoperated link of the plurality of links, while a predetermined number of frames are displayed on the display unit wherein a number of frames displayed by overlapping on the display of the link source page file is limited to the predetermined number,
   closing any of frames being displayed on the display unit and performing a frame display of a page file of the other link corresponding to the further detected frame display operation.

7. The information processing apparatus according to claim 1, wherein the instructions which, when executed by the processor, cause the information processing apparatus to further perform:
   while a frame is displayed by overlapping the display of the link source page file, in response to detecting an operation with respect to a link included in a page file within the frame,
   receiving the page file of the link destination from the Web server, and switching from the display of the link source page file and the frame to a display of the page file of the link destination for which the operation was performed.

8. A non-transitory computer readable storage medium that stores a computer program including instructions which when executed by a processor of an information processing apparatus that receives a link source page file including a plurality of links from a Web server, and displays the link source page file on a display unit, causes the information processing apparatus to perform:

displaying on the display unit the link source page file received from the Web server;

in response to detecting a frame display operation with respect to any of the plurality of links included in the link source page file displayed on the display unit, receiving from the Web server a page file of the link destination of the link that was operated;

performing a frame display on the display unit of the received page file of the link destination in a first frame overlapped on the display of the link source page file, in response to detecting a frame display operation with respect to another link that has not been operated out of the plurality of links while the first frame is overlapped on the display of the link source page file, receiving from the Web server a page file of the other link destination of the other link that was operated; and while maintaining the display of the first frame, performing a frame display on the display unit of the received page file of the other link destination in a second frame that is different from the first frame and is overlapped on the display of the link source page file, wherein the first frame and the second frame display some of the information commonly included in respective page files of the link destinations to be displayed, in the performing a frame display on the display unit of the received page file, the link source page file is grayed out, while the link source page file is grayed out, the plurality of links that the link source page file includes are excluded from the graying out and are selectable, while a predetermined number of frames are displayed on the display unit wherein a number of frames displayed by overlapping on the display of the link source page file is limited to the predetermined number, the link source page file including the plurality of links is grayed out, and in response to closing at least one of the predetermined number of frames, the plurality of links are re-excluded from the graying out.

\* \* \* \* \*